United States Patent
Ware et al.

(10) Patent No.: US 9,131,346 B1
(45) Date of Patent: Sep. 8, 2015

(54) TELEFINDER

(71) Applicants: Elias B. Ware, Dallas, TX (US); Orlin L. Ware, Dallas, TX (US)

(72) Inventors: Elias B. Ware, Dallas, TX (US); Orlin L. Ware, Dallas, TX (US)

( * ) Notice: Subject to any disclaimer, the term of this patent is extended or adjusted under 35 U.S.C. 154(b) by 0 days.

(21) Appl. No.: 14/599,440

(22) Filed: Jan. 16, 2015

(51) Int. Cl.
  *H04W 4/02* (2009.01)
  *H04W 64/00* (2009.01)
  *H04W 4/00* (2009.01)
  *H04W 8/00* (2009.01)

(52) U.S. Cl.
  CPC .............. *H04W 4/026* (2013.01); *H04W 4/008* (2013.01); *H04W 8/005* (2013.01); *H04W 64/006* (2013.01)

(58) Field of Classification Search
  CPC .... H04W 4/02; H04W 64/00; H04M 1/72572
  USPC ......................... 455/456.1–457; 345/158, 659
  See application file for complete search history.

(56) References Cited

U.S. PATENT DOCUMENTS

| | | | |
|---|---|---|---|
| 2008/0076418 A1* | 3/2008 | Beyer, Jr. | 455/435.1 |
| 2011/0199917 A1* | 8/2011 | Karaoguz et al. | 370/252 |
| 2014/0011471 A1* | 1/2014 | Khosla et al. | 455/404.2 |
| 2014/0315577 A1* | 10/2014 | Yokoyama | 455/456.1 |

* cited by examiner

*Primary Examiner* — Sharad Rampuria
*Assistant Examiner* — Farideh Madani
(74) *Attorney, Agent, or Firm* — McClure and Associates, PLLC

(57) ABSTRACT

A method comprising establishing a call between an apparatus and a separate apparatus, establishing a homing session between the apparatus and the separate apparatus, receiving separate apparatus location information from the separate apparatus, determining apparatus location information, receiving orientation sensor information from at least one orientation sensor, determining an apparatus orientation, determining a homing direction to the separate apparatus, determining a separate apparatus direction indicator that represents the homing direction to the separate apparatus, causing display of the separate apparatus direction indicator, terminating the homing session between the apparatus and the separate apparatus, and precluding display of the separate apparatus direction indicator in response to the termination of the homing session between the apparatus and the separate apparatus is disclosed.

20 Claims, 16 Drawing Sheets

US 9,131,346 B1

TELEFINDER

TECHNICAL FIELD

The present application relates generally to determination of a homing direction.

BACKGROUND

In recent times, electronic apparatuses have become increasingly pervasive in our society. In many circumstances, a user of an apparatus may interact with users of other electronic apparatuses in performance of various activities, in various contexts, and/or the like. As such, it may be desirable to configure an apparatus such that a user of the apparatus may find a physical location of a user of another electronic apparatus in a manner that avoids confusion and delay.

SUMMARY

Various aspects of examples of the invention are set out in the claims.

One or more embodiments may provide an apparatus, a computer readable medium, a non-transitory computer readable medium, a computer program product, and/or a method for establishing a call between an apparatus and a separate apparatus, establishing a homing session between the apparatus and the separate apparatus, receiving separate apparatus location information from the separate apparatus, determining apparatus location information, receiving orientation sensor information from at least one orientation sensor, determining an apparatus orientation, determining a homing direction to the separate apparatus, determining a separate apparatus direction indicator that represents the homing direction to the separate apparatus, causing display of the separate apparatus direction indicator, terminating the homing session between the apparatus and the separate apparatus, and precluding display of the separate apparatus direction indicator in response to the termination of the homing session between the apparatus and the separate apparatus.

One or more embodiments may provide an apparatus, a computer readable medium, a computer program product, and/or a non-transitory computer readable medium having means for establishing a call between an apparatus and a separate apparatus, means for establishing a homing session between the apparatus and the separate apparatus, means for receiving separate apparatus location information from the separate apparatus, means for determining apparatus location information, means for receiving orientation sensor information from at least one orientation sensor, means for determining an apparatus orientation, means for determining a homing direction to the separate apparatus, means for determining a separate apparatus direction indicator that represents the homing direction to the separate apparatus, means for causing display of the separate apparatus direction indicator, means for terminating the homing session between the apparatus and the separate apparatus, and means for precluding display of the separate apparatus direction indicator in response to the termination of the homing session between the apparatus and the separate apparatus.

In at least one example embodiment, causation of display of the separate apparatus direction indicator is performed absent display of map information.

One or more example embodiments further perform causation of termination of the call.

In at least one example embodiment, the termination of the homing session between the apparatus and the separate apparatus is performed in response to the termination of the call.

One or more example embodiments further perform receipt of information indicative of a homing session termination input.

In at least one example embodiment, the termination of the homing session between the apparatus and the separate apparatus is performed in response to the homing session termination input.

One or more example embodiments further perform determination of a distance between the apparatus and the separate apparatus based, at least in part, on the apparatus location information and the separate apparatus location information, and determination that the distance is within a threshold homing session termination distance.

In at least one example embodiment, the termination of the homing session between the apparatus and the separate apparatus is performed in response to the determination that the distance is within the threshold homing session termination distance.

One or more example embodiments further perform receipt of information indicative of a homing session termination directive from the separate apparatus.

In at least one example embodiment, the termination of the homing session between the apparatus and the separate apparatus is performed in response to the homing session termination directive, the homing session termination directive being information indicative of a command that is configured to cause the apparatus to terminate the homing session.

In at least one example embodiment, the separate apparatus direction indicator resembles a pointer oriented in a direction that corresponds with the homing direction to the separate apparatus.

One or more example embodiments further perform identification of a phonebook entry stored on the apparatus that corresponds with a user of the separate apparatus, and determination of a user image based, at least in part, on the phonebook entry.

In at least one example embodiment, the separate apparatus direction indicator comprises at least part of the user image.

In at least one example embodiment, the phonebook entry comprises information indicative of a favorite color.

In at least one example embodiment, a color of the separate apparatus direction indicator corresponds with the favorite color.

One or more example embodiments further perform receipt of different separate apparatus location information from the separate apparatus, determination a different homing direction to the separate apparatus based, at least in part, on the different separate apparatus location information, the apparatus location information, and the apparatus orientation, determination of a different separate apparatus direction indicator that represents the different homing direction to the separate apparatus, and causation of display of the different separate apparatus direction indicator.

One or more example embodiments further perform determination of different apparatus location information, determination a different homing direction to the separate apparatus based, at least in part, on the separate apparatus location information, the different apparatus location information, and the apparatus orientation, determination of a different separate apparatus direction indicator that represents the different homing direction to the separate apparatus, and causation of display of the different separate apparatus direction indicator.

One or more example embodiments further perform receipt of different orientation sensor information from the at least one orientation sensor, determination of a different apparatus orientation based, at least in part, on the different orientation sensor information, determination a different homing direction to the separate apparatus based, at least in part, on the separate apparatus location information, the apparatus location information, and the different apparatus orientation, determination of a different separate apparatus direction indicator that represents the different homing direction to the separate apparatus, and causation of display of the different separate apparatus direction indicator.

One or more example embodiments further perform determination of a distance between the apparatus and the separate apparatus based, at least in part, on the apparatus location information and the separate apparatus location information, determination that the distance is within a threshold proximity alert distance, and causation of the separate apparatus to render a proximity alert in response to the determination that the distance is within the threshold proximity alert distance.

In at least one example embodiment, the causation of the separate apparatus to render the proximity alert comprises transmission of a proximity notification to the separate apparatus, the proximity notification being a communication to the separate apparatus that is configured to inform the separate apparatus that the distance is within the threshold proximity alert distance.

In at least one example embodiment, the causation of the separate apparatus to render the proximity alert comprises transmission of a proximity alert directive to the separate apparatus, the proximity alert directive being information indicative of a command that is configured to cause the separate apparatus to render the proximity alert.

In at least one example embodiment, the proximity alert directive comprises a visual proximity alert directive, the visual proximity alert directive being information indicative of a command that is configured to cause the separate apparatus to render a visual proximity alert.

In at least one example embodiment, the visual proximity alert comprises a smoke signal, and the visual proximity alert directive comprises a smoke signal directive.

In at least one example embodiment, the separate apparatus location information comprises information indicative of an outdoor location, and the transmission of the smoke signal directive is performed in further response to the separate apparatus location information being indicative of the outdoor location.

In at least one example embodiment, the visual proximity alert comprises a camera flash signal, and the visual proximity alert directive comprises a camera flash signal directive.

One or more example embodiments further perform receipt of light sensor information from at least one light sensor, and determination that the light sensor information indicates dim light.

In at least one example embodiment, the transmission of the camera flash signal directive is performed in further response to the determination that the light sensor information indicates dim light.

In at least one example embodiment, the proximity alert directive comprises an audible proximity alert directive, the audible proximity alert directive being information indicative of a command that is configured to cause the separate apparatus to render an audible proximity alert.

In at least one example embodiment, the audible proximity alert comprises a voice signal, and the audible proximity alert directive comprises a voice signal directive.

One or more example embodiments further perform identification of a voice profile of a user of the apparatus.

In at least one example embodiment, the voice signal directive designates that the voice signal is rendered by way of the voice profile of the user of the apparatus.

One or more example embodiments further perform identification of a voice profile of a user of the separate apparatus.

In at least one example embodiment, the voice signal directive designates that the voice signal is generated by way of the voice profile of the user of the separate apparatus.

In at least one example embodiment, audible proximity alert comprises a ringtone signal, and the audible proximity alert directive comprises a ringtone signal directive.

One or more example embodiments further perform identification of a ringtone associated with the call.

In at least one example embodiment, the ringtone signal directive designates that the ringtone signal is generated by way of rendering the ringtone.

One or more embodiments may provide a system comprising a first apparatus and a second apparatus, the first apparatus and the second apparatus comprising at least one processor, at least one memory, at least one display, and at least one orientation sensor, the memory comprising instructions that when executed by the processor cause the system to perform establishment of a call between the first apparatus and the second apparatus, the call being at least one of a voice call or a video call; establishment of a homing session between the first apparatus and the second apparatus based, at least in part, on the call; determination, by the second apparatus, of second apparatus location information, the second apparatus location information being information indicative of a geographic location of the second apparatus; transmission, from the second apparatus to the first apparatus, of the second apparatus location information; determination, by the first apparatus, of first apparatus location information, the first apparatus location information being information indicative of a geographic location of the first apparatus; receipt, by the first apparatus, of orientation sensor information from the orientation sensor; determination, by the first apparatus, of a first apparatus orientation based, at least in part, on the orientation sensor information, the first apparatus orientation being indicative of an orientation of the display with respect to a geographical reference direction; determination, by the first apparatus, of a homing direction to the second apparatus based, at least in part, the second apparatus location information, the first apparatus location information, and the first apparatus orientation, the homing direction being a direction from the first apparatus to the second apparatus relative to the first apparatus orientation; determination, by the first apparatus, of a second apparatus direction indicator that represents the homing direction to the second apparatus; display, by the first apparatus, of the second apparatus direction indicator; termination of the homing session between the first apparatus and the second apparatus; and preclusion of display, by the first apparatus, of the second apparatus direction indicator in response to the termination of the homing session between the first apparatus and the second apparatus.

One or more example embodiments further perform determination of a distance between the first apparatus and the second apparatus based, at least in part, on the first apparatus location information and the second apparatus location information, determination that the distance is within a threshold proximity alert distance, and rendering, by the second apparatus, of a proximity alert in response to the determination that the distance is within the threshold proximity alert distance.

In at least one example embodiment, the proximity alert comprises a visual proximity alert.

In at least one example embodiment, the visual proximity alert comprises a smoke signal.

In at least one example embodiment, the second apparatus location information comprises information indicative of an outdoor location, and the rendering of the smoke signal is performed in further response to the second apparatus location information being indicative of the outdoor location.

In at least one example embodiment, the visual proximity alert comprises a camera flash signal.

One or more example embodiments further perform receipt of light sensor information from at least one light sensor, and determination that the light sensor information indicates dim light.

In at least one example embodiment, the rendering of the camera flash signal is performed in further response to the determination that the light sensor information indicates dim light.

In at least one example embodiment, the proximity alert comprises an audible proximity alert.

In at least one example embodiment, the audible proximity alert comprises a voice signal.

One or more example embodiments further perform identification of a voice profile of a user of the first apparatus.

In at least one example embodiment, the voice signal is rendered by way of the voice profile of the user of the first apparatus.

One or more example embodiments further perform identification of a voice profile of a user of the second apparatus.

In at least one example embodiment, the voice signal is rendered by way of the voice profile of the user of the second apparatus.

In at least one example embodiment, the audible proximity alert comprises a ringtone signal.

One or more example embodiments further perform identification of a ringtone associated with the call.

In at least one example embodiment, rendering the ringtone signal comprises rendering the ringtone.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
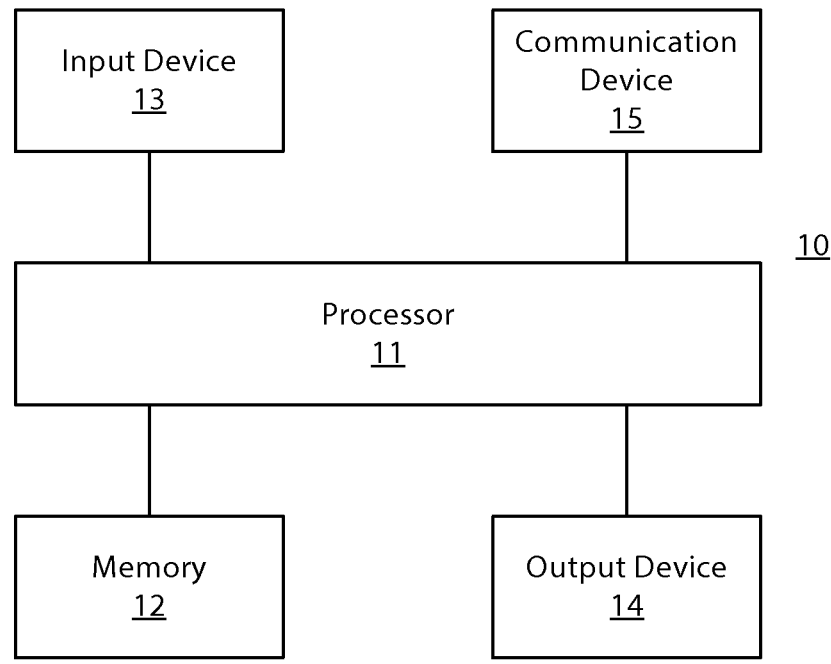
FIG. 1 is a block diagram showing an apparatus according to at least one example embodiment.

An embodiment of the invention and its potential advantages are understood by referring to FIGS. 1 through 13 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a laptop computer, a tablet computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display, or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
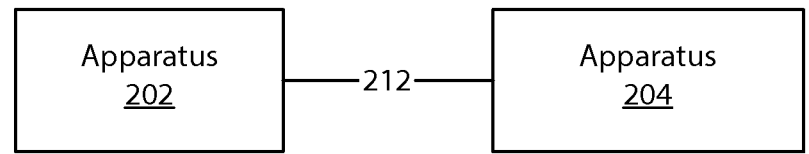
FIG. 2 is a block diagram illustrating apparatus communication according to at least one example embodiment.

FIG. 2 is a block diagram illustrating apparatus communication according to at least one example embodiment. The example of FIG. 2 is merely an example and does not limit the scope of the claims. For example, apparatus count may vary, apparatus configuration may vary, communication channels may vary, and/or the like.

In many circumstances, a user with an apparatus and another user with a separate apparatus may desire to communicate. For example, the users may desire to send and/or receive messages, send and/or receive audio calls, send and/or receive video calls, and/or the like. As such, it may be desirable to facilitate communication between the user and the other user by way of the apparatus and the separate apparatus. For example, it may be desirable to allow for communication between an apparatus and a separate apparatus. In such an example, each of the apparatus and the separate apparatus may be a phone, a tablet, a computer, a laptop, an electronic apparatus, a server, a wearable apparatus, a head mounted apparatus, a projector, a near eye display, and/or the like. In at least one example embodiment, an apparatus and a separate apparatus communicate via a direct communication channel, an indirect communication channel, and/or the like. In such an example embodiment, the indirect communication channel may route communication between the apparatus and the separate apparatus by way of one or more routers, switches, hubs, distribution servers, and/or the like. In at least one example embodiment, an apparatus and a separate apparatus communicate via an indirect communication channel by way of a server. In such an example embodiment, the server may be a computer, a service platform, a repository, an application, and/or the like. For example, the server, may be configured to update an account associated with the separate apparatus such that the separate apparatus may receive information from the apparatus by way of accessing the account via the server.

In the example of FIG. 2, apparatus 202 communicates with apparatus 204 by way of communication channel 212. For example, apparatus 202 may send information to apparatus 204 by way of communication channel 212, apparatus 202 may receive information sent from apparatus 204 by way of communication channel 212, and/or the like. It should be understood that, even though the example of FIG. 2 illustrates a direct communication channel between apparatus 202 and apparatus 204, there may be intermediate apparatuses that facilitate communication between apparatus 202 and apparatus 204. For example, there may be one or more routers, hubs, switches, gateways, base stations, and/or the like, that are utilized in the communication channels between apparatus 202 and apparatus 204. In addition, there may be one or more separate apparatuses that apparatus 202 and/or apparatus 204 are in communication with. For example, apparatus 202 and/or apparatus 204 may be in communication with another apparatus, a separate apparatus, a different apparatus, and/or the like.

In many circumstances, during communication with an apparatus and a separate apparatus, it may be desirable for the apparatuses to share information. For example, information shared between the apparatuses may help facilitate the communication, may provide useful information to the users of the apparatuses, and/or the like. Information shared between the apparatus and the separate apparatus may include information about the apparatus, information about the separate apparatus, information about the user of the apparatus, information about the user of the separate apparatus, and/or the like. For example, the apparatus and the separate apparatus may share information with respect to the location of the separate apparatus. In some circumstances, a plurality of apparatuses may share information by way of local communication among the apparatuses. For example, the apparatuses may share information by way of low power radio frequency communication, a radio frequency communication, near field communication, inductive communication, electric field communication, Bluetooth communication, infrared communication, local area network communication, wireless local area network communication, local port communication, input/output port communication, and/or the like. In some circumstances, apparatuses may share information by way of non-local communication among the apparatuses. For example, the apparatuses may communicate by way of high power radio frequency communication, wide area network communication, internet communication, cellular network communication, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform.

In many circumstances, a user of an apparatus may desire to communicate with another individual, such as a friend, a colleague, and/or the like by way of audio communication, video communication, and/or the like. In such circumstances, the other individual may commonly utilize a separate apparatus. As such, the user and the other individual may desire to communicate with each other by way of a call between the user's apparatus and the other user's separate apparatus. A call may refer to a real time audio and/or video communication between a user of an apparatus and a user of a separate apparatus facilitated by a communication channel between the apparatus and the separate apparatus. A call may be established over any communication channel, such as a wireless network, a cellular telephone network, an Internet Protocol network, a direct data link between the apparatus and the separate apparatus, and/or the like. For example, a call may be a cellular telephone call, a voice over internet protocol call, a call initiated over a service such as Skype, FaceTime, and/or the like, a two-way radio call, and/or the like. In at least one example embodiment, the apparatus establishes a call between the apparatus and a separate apparatus.

In some circumstances, a user of an apparatus may desire to communicate with a user of a separate apparatus by way of voice communication. For example, voice communication may be more efficient than text based communication, the user may not wish to type, and/or the like. In circumstances such as this, it may be desirable for the apparatus to establish a voice call between the apparatus and the separate apparatus. A voice call may refer to a call comprising audio information. In at least one example embodiment, the apparatus establishes a voice call between the apparatus and a separate apparatus. In some circumstances, a user of an apparatus may desire to communicate with a user of a separate apparatus by way of video communication. For example, video communication may be more efficient than text or audio based communication, the user of the apparatus may wish to transmit images that are difficult to describe, the user of the apparatus may wish for the user of the separate apparatus to view a remote event, and/or the like. In circumstances such as these, it may be desirable for the apparatus to establish a video call with the separate apparatus. A video call may refer to a call comprising video information. In at least one example embodiment, the apparatus establishes a video call between the apparatus and a separate apparatus.

In some circumstances, a user of an apparatus may desire to end a call with a user of a separate apparatus. For example, the quality of the call may have deteriorated, the preferred communication channel may no longer be available, a user may desire to conserve battery power, communication between the users may be possible without apparatuses, and/or the like. In circumstances such as these, it may be desirable for an apparatus to cause termination of the call. Termination of a call may refer to actions performed to end a previously established call. For example, termination of a call may include relinquishment of a communication channel, deactivation of a transceiver, and/or the like. In at least one example embodiment, the apparatus causes termination of a call.

In some circumstances, the quality of a communication channel used for a call may be poor. For example, the call may be dropped by a network that is facilitating the call, a bit error rate on the communication channel may exceed a predetermined threshold, the communication channel may have a high signal to noise ratio, and/or the like. In circumstances such as these it may be desirable for the apparatus to terminate the call. In a least one example embodiment, termination of a call is performed in response to poor communication channel quality. For example, the apparatus may determine that the communication channel has a high signal to noise ratio, and the apparatus may terminate the call in response to the high signal to noise ratio.

In some circumstances, a user may expressly desire to terminate call. For example, the user may no longer wish to speak with another party to the call, the call may have been established in error, and/or the like. In circumstances such as these, it may be desirable to communicate the user's desire to terminate the call to the apparatus. In at least one example embodiment, termination of a call is performed in response to a user input. For example, the apparatus may receive input indicative of a call termination input from a user of the apparatus. A call termination input may refer to an input received from a user that instructs the apparatus to terminate a call between the apparatus and a separate apparatus. For example, a call termination input may be a particular touch screen input, a particular voice input, a particular button press, and/or the like similar as described regarding FIG. 1. A termination of a call in response to a user input may be referred to as an express call termination.

Figure 3A:
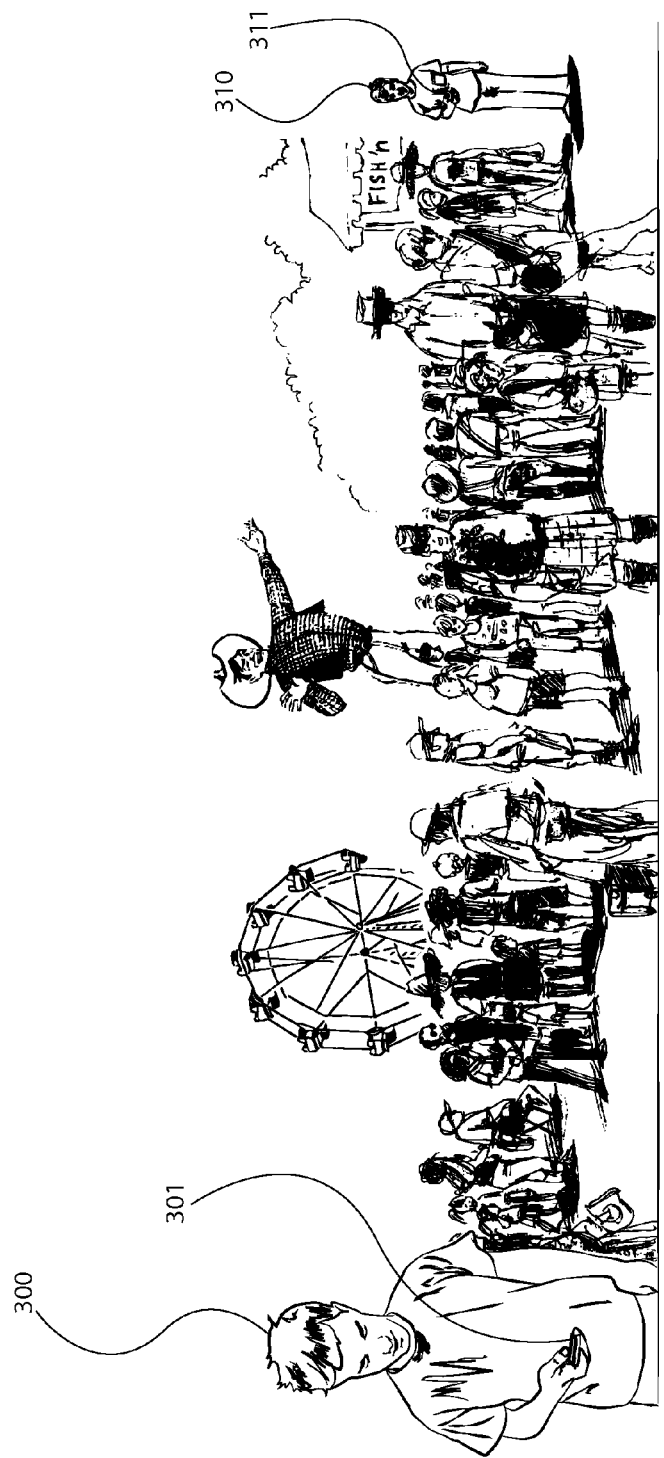
FIGS. 3A-3B are diagrams illustrating a user of an apparatus and a user of a separate apparatus according to at least one example embodiment.
Figure 3B:
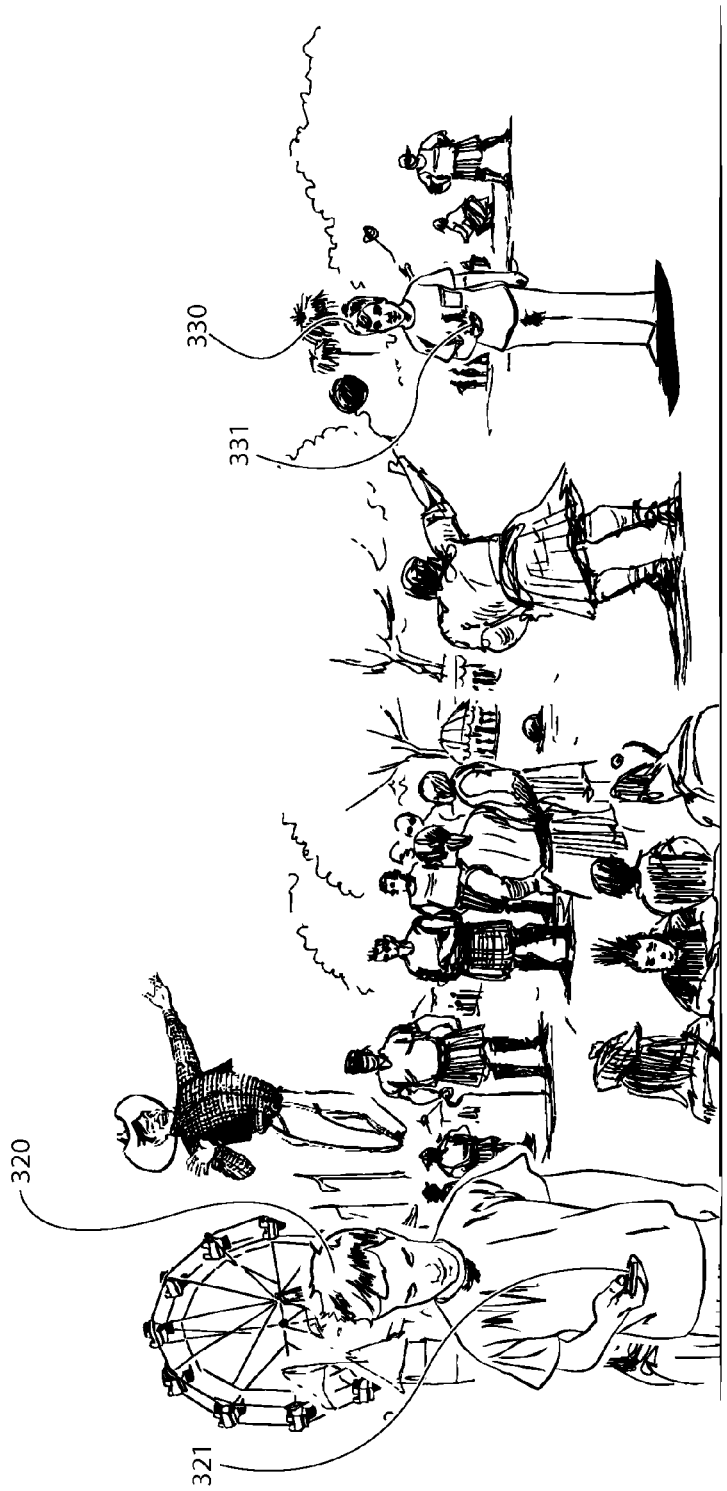

FIGS. 3A-3B are diagrams illustrating a user of an apparatus and a user of a separate apparatus according to at least one example embodiment. The examples of FIGS. 3A-3B are merely examples and do not limit the scope of the claims. For example, the number of users may vary, the number of apparatuses may vary, the types of apparatuses may vary, and/or the like.

In some circumstances, as previously described, a user of an apparatus may establish a call with a user of a separate apparatus. During such a call, the user of the apparatus may desire to locate the user of the separate apparatus. For example, the user of the apparatus may wish to meet with the user of the separate apparatus in person, may wish to communicate the location of the user of the separate apparatus to a third party, may wish to instruct the user of the separate apparatus how to reach a different location, and/or the like. In circumstances such as these, it may be difficult for the user of the apparatus to locate the user of the separate apparatus. For instance, the distance between the users may be large, the view between the users may be obstructed, the environment may be crowded with other people, and/or the like. For example, the user of the apparatus may use the apparatus at a particular location and the user of the separate apparatus may be using the separate apparatus at a location that differs from the location of the apparatus. For example, FIG. 3A illustrates user 300 of apparatus 301 and user 310 of a separate apparatus 311. Apparatus 301 and/or separate apparatus 311 may be similar as described regarding apparatus 10 of FIG. 1, apparatus 202 of FIG. 2, apparatus 204 of FIG. 2, and/or the like. It can be seen in the example of FIG. 3A that user 300 and user 310 are separated by a crowd of people.

In some circumstances, it may be desirable to facilitate determining the location of the user of the separate apparatus based, at least in part, on the location of the separate apparatus. For instance, in the example of FIG. 3A, it may be desirable to configure apparatus 301 such that the user 300 may locate user 310 by way of apparatus 301. For example, apparatus 301 may provide user 300 with information that allows user 300 to find user 310, may provide navigation information that directs user 300 to user 310, may route user 300 to user 310, and/or the like.

In circumstances such as these, in order to provide assistance to the user in locating the other user, it may be desirable to establish a homing session between the apparatus and the separate apparatus. A homing session may refer to an interactive session in which an apparatus determines the physical location of a separate apparatus and the apparatus informs the user of the apparatus of the physical location of the separate apparatus. In this manner, the user of the apparatus may determine the location of the user of the separate apparatus based, at least in part, on the homing session between the apparatus and the separate apparatus.

In some circumstances, a user of an apparatus may establish a call with a user of a different apparatus for the express purpose of determining the location of the user of the separate apparatus. In circumstances such as these, it may be desirable to automatically establish a homing session between the apparatus and the separate apparatus. For example, the apparatus may establish a homing session between the apparatus and the separate apparatus based, at least in part, on the call. Establishing the homing session based on the call may simplify the user's interaction with the apparatus. In at least one example embodiment, a homing session is established between an apparatus and a separate apparatus based, at least in part, on a call. For example, a homing session may be established between apparatus 301 and separate apparatus 311 of FIG. 3A by the establishment of a call between apparatus 301 and separate apparatus 311. The establishment of the call may be similar as described regarding FIG. 2.

In some circumstances, a user of an apparatus may wish to establish a homing session with a user of a separate apparatus based on a particular input. For example, the user of the apparatus may have already established a call with the user of the separate apparatus, may not wish for the establishment of the homing session to occur automatically based on the establishment of a call, and/or the like. In at least one example embodiment, a homing session is established between an apparatus and a separate apparatus is performed in response to a homing session establishment input. For instance, in the example of FIG. 3A, apparatus 301 and/or separate apparatus 311 may receive information indicative of a homing session establishment input, and a homing session between apparatus 301 and separate apparatus 311 may be established in response to the homing session establishment input. A homing session establishment input may refer to any input that causes establishment of a homing session between an apparatus and a separate apparatus when information indicative of the homing session establishment input is received by the apparatus and/or the separate apparatus. For example, a homing session establishment input may be a touch screen input, a voice input, a button press, and/or the like similar as described regarding FIG. 1.

Oftentimes, during a homing session between an apparatus and a separate apparatus, the user of the apparatus may become proximate to the user of the separate apparatus. Proximate to a user may refer to a user being within a threshold distance of another user. For example, a user standing within ten feet of another user may be proximate to the other user. In another example, a user standing beyond twenty feet of another use may not be proximate to the other user. The example of FIG. 3B illustrates user 320 of apparatus 321 and user 330 of separate apparatus 331. Apparatus 321 and/or separate apparatus 331 may be similar as described regarding apparatus 10 of FIG. 1, apparatus 202 of FIG. 2, apparatus 204 of FIG. 2, and/or the like. In the example of FIG. 3B, it should be understood that user 320 and user 330 are standing proximate to each other. In circumstances such as these, it may be desirable to terminate a homing session between the apparatus and the separate apparatus. For example, terminating the homing session may conserve resources on the apparatus and/or the separate apparatus. For instance, the termination of the homing session may conserve battery power, data usage, and/or the like.

In some circumstances, a user of an apparatus may wish to terminate a homing session between the apparatus and a separate apparatus automatically. For example, the homing session may have been established based on a call, and the call may have terminated. In circumstances such as these, it may be desirable to terminate the homing session based, at least in part, on the termination of the call. In at least one example embodiment, termination of a homing session between an apparatus and a separate apparatus is performed in response to termination of a call. For instance, in the example of FIG. 3B, a call may have been established between apparatus 321 and separate apparatus 331. In such an example, a homing session may be established between apparatus 321 and separate apparatus 331. In such an example, if the call between apparatus 321 and apparatus 331 is terminated, the homing session between apparatus 321 and separate apparatus 331 may be terminated in response to termination of the call between apparatus 321 and separate apparatus 331. The termination of the call may be similar as described regarding FIG. 2.

In some circumstances, a user of an apparatus may wish to terminate a homing session with a user of a separate apparatus based on a particular input. For example, the homing session may have been established based on a call, and the user may wish to continue with the call after terminating the homing session. In at least one example embodiment, termination of a homing session between an apparatus and a separate apparatus is performed in response to the homing session termination input. For instance, in the example of FIG. 3B, a homing session may have been established between apparatus 321 and separate apparatus 331. In this example, apparatus 321 and/or separate apparatus 331 may receive information indicative of a homing session termination input, and the homing session between apparatus 321 and separate apparatus 331 may be terminated in response to the homing session termination input. A homing session termination input may refer to any input received from a user that instructs the apparatus and/or separate apparatus to terminate a homing session between the apparatus and the separate apparatus. For example, a homing session termination input may be a particular touch screen input, a particular voice input, a particular button press, and/or the like similar as described regarding FIG. 1.

As previously described, in some circumstances, a user of an apparatus may wish to terminate a homing session with a user of a separate apparatus based on proximity. For example, the user of the apparatus may be proximate to the user of the separate apparatus, and the homing session may no longer be necessary for the user of the apparatus to locate the user of the separate apparatus. In at least one example embodiment, termination of a homing session between an apparatus and a separate apparatus is performed in response to a determination that the distance between the apparatus and the separate apparatus is within a threshold homing session termination distance. A threshold homing session termination distance may refer to a predefined distance between an apparatus and a separate apparatus in which it is desirable for a homing session between the apparatus and the separate apparatus to be terminated. Being within a threshold homing session termination distance refers to the distance between the apparatus and the separate apparatus being less than the threshold homing session termination distance, less than or equal to the threshold homing session termination distance, and/or the like. For instance, in the example of FIG. 3B, a homing session may be established between apparatus 321 and separate apparatus 331, and the threshold homing session termination distance may be ten feet. In this example, apparatus 321 may determine that the distance between apparatus 321 and separate apparatus 331 is less than ten feet, and apparatus 321 may cause termination of the homing session between apparatus 321 and separate apparatus 331 in response to the determination that the distance between apparatus 321 and separate apparatus 331 is less than ten feet. In at least one example embodiment, determination of the distance between the apparatus and the separate apparatus is based, at least in part, on apparatus location information and separate apparatus location information. The apparatus location information and the separate apparatus location information may be similar as described regarding FIGS. 5A-5E.

In some circumstances, a user of and apparatus and/or a user of a separate apparatus may wish to explicitly terminate a homing session. For example, the user of the separate apparatus may wish to terminate the homing session because of privacy concerns, to avoid sharing of location information with the user of the apparatus, and/or the like. Explicit termination of a homing session may be facilitated by way of a homing session termination directive. A homing session termination directive may refer to information indicative of a command that is configured to cause the apparatus to terminate the homing session. For example, a homing session termination directive may be information transmitted from the apparatus to the separate apparatus, information transmitted from the separate apparatus to the apparatus, and/or the like. In at least one example embodiment, termination of a homing session between an apparatus and a separate apparatus is performed in response to a homing session termination directive. For instance, in the example of FIG. 3B, a homing session may be established between apparatus 321 and separate apparatus 331. User 330 may wish to terminate the homing session in order to discontinue sharing information indicative of his location with user 320. User 330 may perform an action that causes separate apparatus 331 to transmit a homing session termination directive to apparatus 321. In this example, apparatus 321 may receive information indicative of the homing session termination directive from separate apparatus 331, and apparatus 321 may cause termination of the homing session between apparatus 321 and separate apparatus 331 in response to the homing session termination directive.

In some circumstances, it may be desirable to terminate a homing session based on other factors. For example, in some circumstances, the quality of a communication channel used for a homing session may be poor. For instance, a call carrying the homing session may be dropped by a network that is facilitating the call, a bit error rate on the communication channel may exceed a predetermined threshold, the communication channel may have a high signal to noise ratio, and/or the like. Such poor communication channel quality may lead to errors in the homing session. In circumstances such as these it may be desirable for the apparatus to terminate the homing session. For example, terminating the homing session may alert the user of the apparatus that there was a problem with the homing session. In a least one example embodiment, termination of a homing session is performed in response to poor communication channel quality. For example, the apparatus may determine that the communication channel has dropped a call carrying the homing session, and the apparatus may terminate the homing in response to the dropped call.

Figures 4A, 4B:
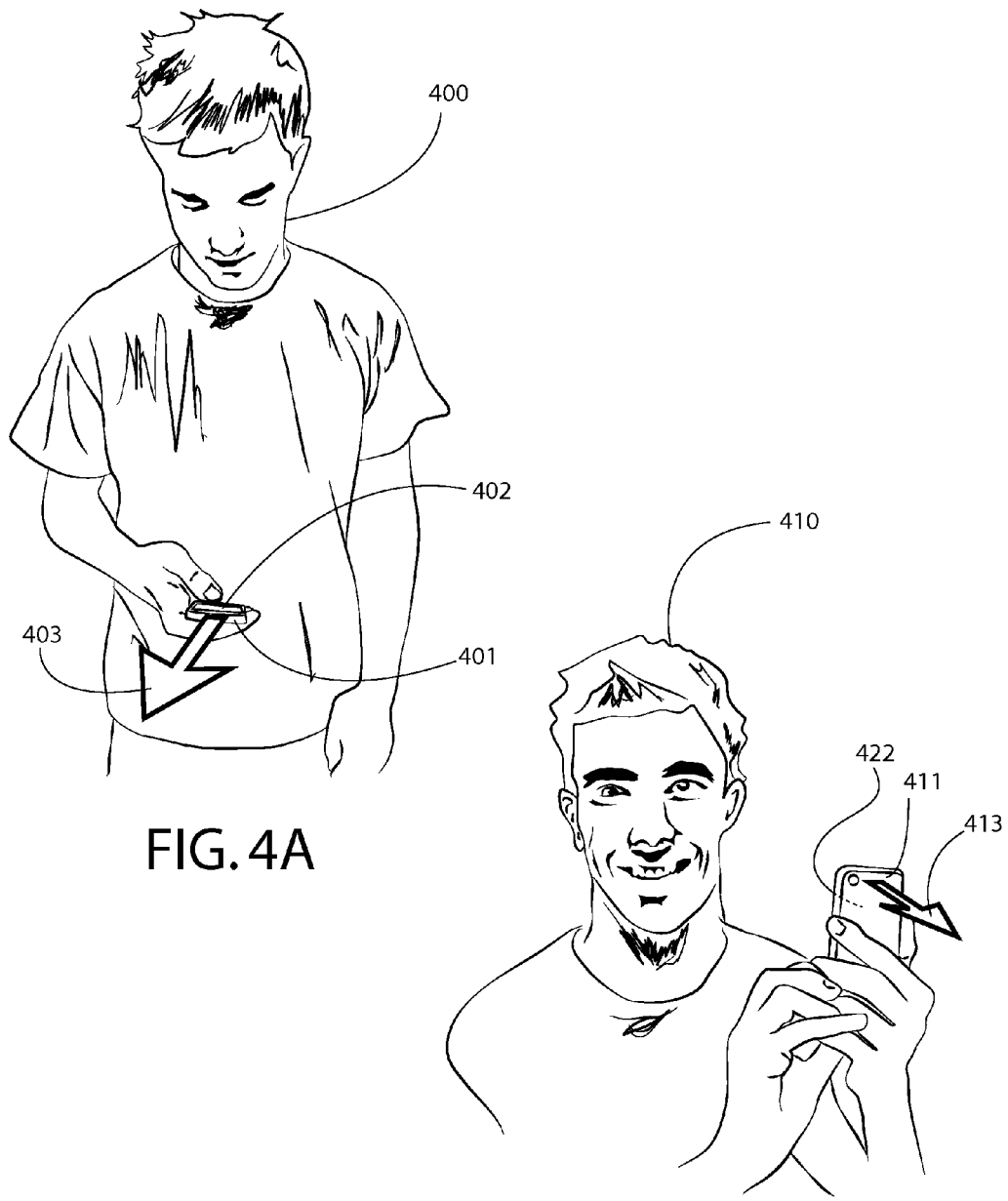
FIGS. 4A-4B are diagrams illustrating apparatus orientation according to at least one example embodiment.

FIGS. 4A-4B are diagrams illustrating apparatus orientation according to at least one example embodiment. The examples of FIGS. 4A-4B are merely examples and do not limit the scope of the claims. For example, the apparatus orientation may vary, the apparatus type may vary, the reference direction may vary, and/or the like.

In many circumstances, a user of an apparatus may hold an apparatus in a particular orientation. For example, it may be comfortable for a user to hold an apparatus in a particular orientation, a screen comprised by the apparatus may be easily viewed in a particular orientation, one or more buttons comprised by the apparatus may be easily manipulated by the user when the apparatus is in a particular orientation, and/or the like. In circumstances such as these, it may be necessary to render information on a display based on an orientation of the display. For example, the apparatus orientation may be indicative of the orientation of the display. In circumstances such as these, it may be desirable to determine the apparatus orientation to facilitate the rendering of information based on the display orientation. Apparatus orientation may refer to the orientation of an apparatus with respect to respect to a geographical reference direction. A geographic reference direction may refer to the direction of gravity, magnetic north, a direction parallel to a surface, and/or the like. In at least one example embodiment, the apparatus orientation is indicative of an orientation of a display with respect to a geographical reference direction.

In the example of FIG. 4A, user 400 is holding apparatus 401, which comprises display 402. Apparatus 401 may be similar as described regarding apparatus 10 of FIG. 1, apparatus 202 of FIG. 2, Apparatus 204 of FIG. 2, and/or the like. In the example of FIG. 4A, apparatus 401 is held in a manner such that the image plane of display 402 is parallel to geographical reference direction 403 with respect to the ground. It can be seen that geographical reference direction 403 is a direction parallel to the ground.

In the example of FIG. 4B, user 410 is holding apparatus 411, which comprises display 412. Apparatus 411 may be similar as described regarding apparatus 10 of FIG. 1, apparatus 202 of FIG. 2, Apparatus 204 of FIG. 2, and/or the like. In the example of FIG. 4B, apparatus 411 is held in a manner such that the image plane of display 412 is perpendicular to geographical reference direction 413 with respect to the ground. It can be seen that geographical reference direction 413 is a direction parallel to the ground.

In at least one example embodiment, the apparatus determines an apparatus orientation based, at least in part, on orientation sensor information received from at least one orientation sensor. For instance, an apparatus may have an orientation similar to the orientation of apparatus 401 in the example of FIG. 4A, and may receive orientation sensor information from at least one orientation sensor. In this example, the apparatus may determine that the apparatus has the orientation similar to the orientation of apparatus 401 as illustrated in FIG. 4A based on the orientation sensor information. An orientation sensor may refer to any sensor that may indicate the orientation of an associated apparatus. For example, an orientation sensor may be an accelerometer sensor, an infrared sensor, an optical sensor, a proximity sensor, a gyroscopic sensor, a Hall Effect sensor, a magnetometer sensor, a light sensor, and/or the like. Orientation information may refer to information received from an orientation sensor indicative of an apparatus orientation, an apparatus component orientation, and/or the like. In at least one example embodiment, orientation sensor information comprises information indicative of an orientation of a display with respect to a geographical reference direction.

In some circumstances, a user of an apparatus may change the orientation of the apparatus. For example, the user of the apparatus may be holding the apparatus with an orientation similar to the orientation of apparatus 401 in the example of FIG. 4A, and change the orientation of the apparatus such that the apparatus has a different orientation, such as an orientation that is similar to the orientation of apparatus 411 in the example of FIG. 4B. In circumstances such as these, it may be desirable for the apparatus to determine the different apparatus orientation. For example, information displayed on the apparatus may need to be modified to accommodate the different apparatus orientation, updated in response to the change in orientation, and/or the like. In at least one example embodiment, the apparatus receives different orientation sensor information from a least one orientation sensor. In at least one example embodiment, the apparatus determines a different apparatus orientation based, at least in part, on the different orientation sensor information.

FIGS. 5A-5E are diagrams illustrating homing directions according to at least one example embodiment. The examples of FIGS. 5A-5E are merely examples and do not limit the scope of the claims. For example, the number of devices may vary, the type of devices may vary, the orientation of the devices may vary, and/or the like.

In some circumstances, as previously described, an apparatus may comprise a display. In some circumstances, as previously described, it may be desirable to establish a homing session between an apparatus and a separate apparatus. In circumstances where a homing session has been established between an apparatus comprising a display and a separate apparatus, it may be desirable for the apparatus to display information indicative of the location of the separate apparatus on the display. For example, the user may wish to see the location of the separate apparatus displayed on the apparatus, it may be intuitive for the user of the apparatus to locate the separate apparatus by viewing the information indicative of the location of the separate apparatus that is displayed on the display of the apparatus, and/or the like. The information displayed on the apparatus may be indicative of a direction to the separate apparatus, may provide information that guides the user to the separate apparatus, tells the user to follow a certain rout to the separate apparatus, and/or the like. For instance, the apparatus may cause display of a separate apparatus direction indicator on the display. A separate apparatus direction indicator may refer to an indicator displayed on a display that represents a homing direction to the separate apparatus. A homing direction may refer to a direction from the apparatus to the separate apparatus relative to the apparatus orientation. In at least one example embodiment, the apparatus determines a homing direction to the separate apparatus. In at least one example embodiment, the apparatus determines a separate apparatus indicator that represents the homing direction to the separate apparatus. In at least one example embodiment, the apparatus causes display of a separate apparatus direction indicator. In at least one example embodiment, the separate apparatus direction indicator resembles a pointer oriented in a direction that corresponds with the homing direction to the separate apparatus.

In some circumstances, it may be desirable to display the separate apparatus direction indicator absent display of map information. For example, map information may clutter the display, confuse the user of the apparatus, and/or the like. Map information may comprise one or more cartographic details such as roads, geographical features, political boundaries, labels, and/or the like. For example, map information may comprise a visual representation of a city street layout, with labels for street names, and the borders of the city. In another example, the map information may comprise a floor plan of a large structure, such as an office building, a cruise ship, a stadium, and/or the like. In at least one example embodiment, causation of display of the separate apparatus direction indicator is performed absent display of map information. As previously described, in some circumstances a homing session between an apparatus and a separate apparatus may be terminated. In at least one example embodiment, the apparatus precludes display of the separate apparatus direction indicator in response to the termination of the homing session between the apparatus and the separate apparatus.

Figure 5A:
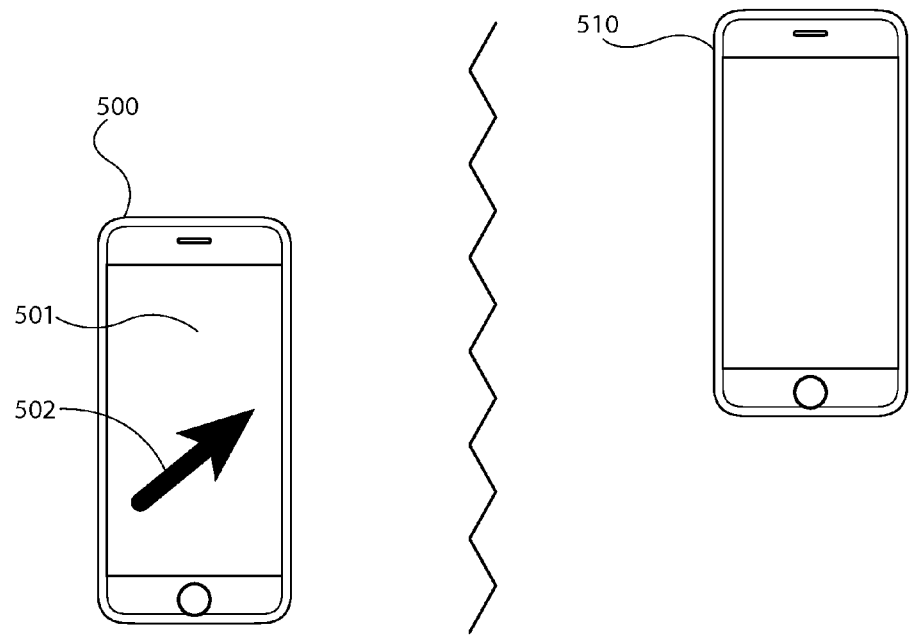
FIGS. 5A-5E are diagrams illustrating homing directions according to at least one example embodiment.
Figure 5B:
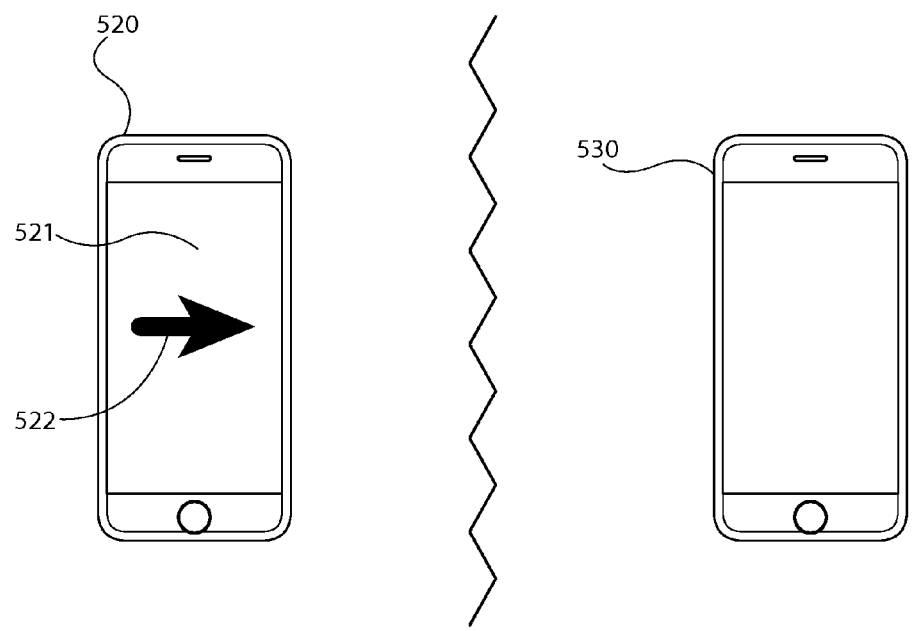

The example of FIG. 5A illustrates apparatus 500 comprising display 501. Apparatus 500 may be similar as described regarding apparatus 10 of FIG. 1, apparatus 202 of FIG. 2, apparatus 204 of FIG. 2, and/or the like. In the example of FIG. 5A, separate apparatus direction indicator 502 is displayed on display 501. It can be seen in the example of FIG. 5A that separate apparatus direction indicator 502 indicates a homing direction from apparatus 500 to separate apparatus 510. Separate apparatus 510 may be similar as described regarding apparatus 10 of FIG. 1, apparatus 202 of FIG. 2, Apparatus 204 of FIG. 2, and/or the like. The example of FIG. 5B illustrates apparatus 520 comprising display 521. Apparatus 520 may be similar as described regarding apparatus 10 of FIG. 1, apparatus 202 of FIG. 2, Apparatus 204 of FIG. 2, and/or the like. In the example of FIG. 5B, separate apparatus direction indicator 522 is displayed on display 521. It can be seen in the example of FIG. 5B that separate apparatus direction indicator 522 indicates a homing direction from apparatus 520 to separate apparatus 530. Separate apparatus 530 may be similar as described regarding apparatus 10 of FIG. 1, apparatus 202 of FIG. 2, Apparatus 204 of FIG. 2, and/or the like.

Figure 5C:
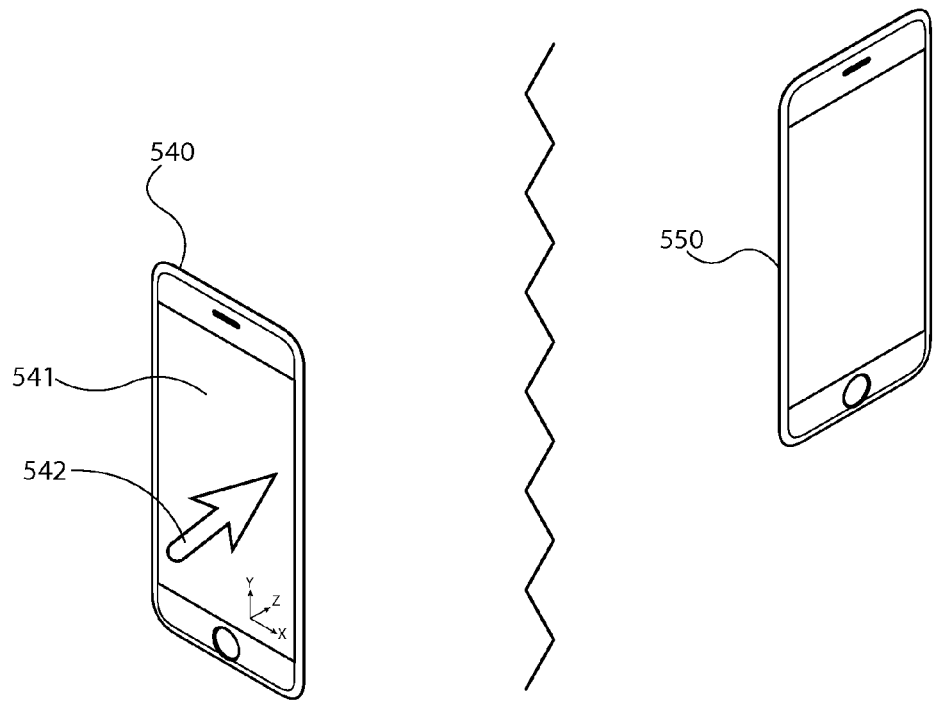
Figure 5D:
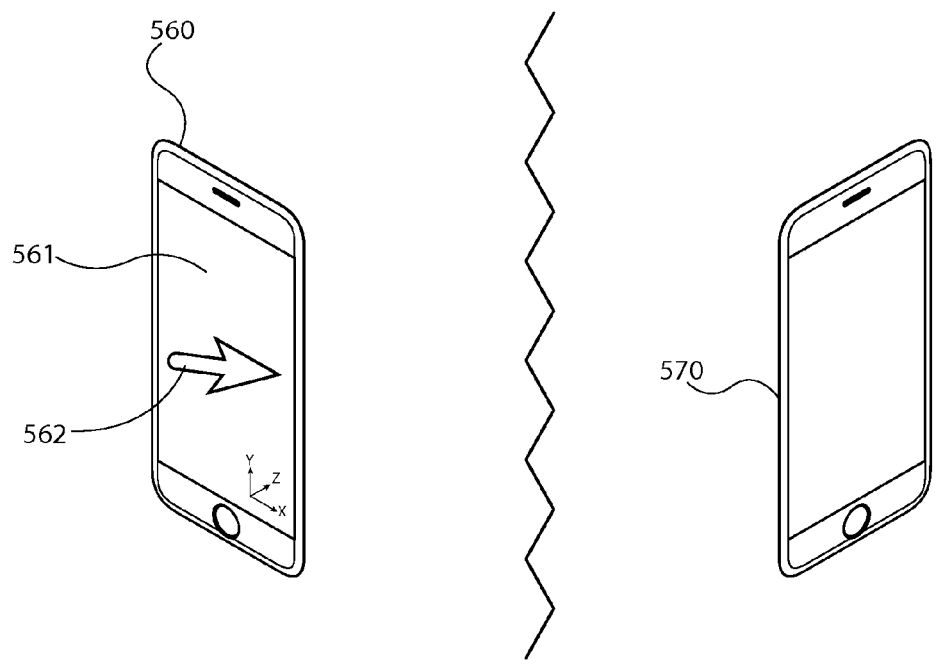

In some circumstances, it may be desirable to render a separate apparatus direction indicator with a three dimensional appearance. For example, if the user is holding a device with an upright orientation, similar to the orientation of apparatus 411 in the example of FIG. 4B, a three dimensional separate apparatus direction indictor may portray the homing direction to the user more intuitively than a two dimensional separate apparatus indicator. The example of FIG. 5C illustrates apparatus 540 comprising display 541. Apparatus 540 may be similar as described regarding apparatus 10 of FIG. 1, apparatus 202 of FIG. 2, apparatus 204 of FIG. 2, and/or the like. In the example of FIG. 5C, separate apparatus direction indicator 542 is displayed on display 541. It can be seen in the example of FIG. 5C that separate apparatus direction indicator 542 indicates a homing direction from apparatus 540 to separate apparatus 550, and that separate apparatus direction indicator 542 has been rendered with a three dimensional appearance. Separate apparatus 550 may be similar as described regarding apparatus 10 of FIG. 1, apparatus 202 of FIG. 2, apparatus 204 of FIG. 2, and/or the like. The example of FIG. 5D illustrates apparatus 560 comprising display 561. Apparatus 560 may be similar as described regarding apparatus 10 of FIG. 1, apparatus 202 of FIG. 2, apparatus 204 of FIG. 2, and/or the like. In the example of FIG. 5D, separate apparatus direction indicator 562 is displayed on display 561. It can be seen in the example of FIG. 5D that separate apparatus direction indicator 562 indicates a homing direction from apparatus 560 to separate apparatus 570, and that separate apparatus direction indicator 562 has been rendered with a three dimensional appearance. Separate apparatus 570 may be similar as described regarding apparatus 10 of FIG. 1, apparatus 202 of FIG. 2, apparatus 204 of FIG. 2, and/or the like.

In at least one example embodiment, the apparatus determines a homing direction to the separate apparatus based, at least in part, on separate apparatus location information. Separate apparatus location information may refer to information indicative of a geographic location of the separate apparatus. For instance, in the example of FIG. 5A, apparatus 500 may have determined a homing direction represented by separate apparatus direction indicator 502 based, at least in part, on the information indicative of the location of separate apparatus 510. In at least one example embodiment, the separate apparatus location information is received from the separate apparatus. For instance, in the example of FIG. 5A, apparatus 500 may have determined a homing direction represented by separate apparatus direction indicator 502 based, at least in part, on separate apparatus location information received from separate apparatus 510.

In at least one example embodiment, the apparatus determines a homing direction to the separate apparatus based, at least in part, on apparatus location information. Apparatus location information may refer to information indicative of a geographic location of the apparatus. For instance, in the example of FIG. 5A, apparatus 500 may have determined a homing direction represented by separate apparatus direction indicator 502 based, at least in part, on apparatus location information determined by apparatus 500. In at least one example embodiment, the apparatus location information is determined by the apparatus.

In at least one example embodiment, the apparatus determines a homing direction to the separate apparatus based, at least in part, on the apparatus orientation. The apparatus orientation may be determined similar as described regarding FIGS. 4A-4B. For instance, in the example of FIG. 5A, apparatus 500 may have determined a homing direction represented by separate apparatus direction indicator 502 based, at least in part, on the orientation of apparatus 500.

In many circumstances, during a homing session between an apparatus and a separate apparatus, the location of the separate apparatus may change, the location of the apparatus may change, the orientation of the apparatus may change, and/or the like. For instance, the user of the separate apparatus and/or the user of the apparatus may travel closer to one another, the user of the apparatus may change the orientation of the apparatus for easier viewing, and/or the like. For example, the apparatus may begin a homing session between the apparatus and the separate apparatus with an initial orientation and location with respect to the separate apparatus similar as illustrated in FIG. 5A. During the homing session of this example, the orientation and location of the apparatus with respect to the separate apparatus may change to a different orientation and location similar as illustrated in FIG. 5D. In circumstances such as these, the homing direction from the apparatus to the separate apparatus may change to a different homing direction. For example, the homing direction may change to the homing direction represented by separate apparatus direction indicator 502 in FIG. 5A to the homing direction represented by separate apparatus direction indicator 562 in FIG. 5D. In circumstances such as these, it may be desirable to determine the different homing direction and cause display of a different separate apparatus direction indicator that represents the different homing direction to the separate apparatus. For instance, in the previous example if the apparatus is displaying a separate apparatus direction indicator similar to separate apparatus direction indicator 502 of FIG. 5A, the apparatus may cause display of a separate apparatus direction indicator similar to separate apparatus direction indicator 562 of FIG. 5D. In circumstances such as these, changing the separate apparatus direction indicator to a different separate apparatus direction indicator as the separate apparatus location, the apparatus location, the apparatus orientation changes, and/or the like, may aid the user in quickly locating the separate apparatus during a homing session.

In at least one example embodiment, the apparatus determines a different homing direction to the separate apparatus based, at least in part, on different separate apparatus location information. For instance, in the example of FIG. 5A, apparatus 500 may have determined a homing direction represented by separate apparatus direction indicator 502 based, at least in part, on the information indicative of the location of separate apparatus 510. In this example, the location of separate apparatus 510 may change to a different location, such as the location of apparatus 530 in the example of FIG. 5B. In this example, apparatus 500 may determine a different homing direction to apparatus 510. In this manner, apparatus 500 may determine a different separate apparatus direction indicator based, at least in part, on the different homing direction to apparatus 510 such that the different separate apparatus indicator indicates a direction from apparatus 500 to the different location of apparatus 510.

In at least one example embodiment, the apparatus determines a homing direction to the separate apparatus based, at least in part, on apparatus location information. Apparatus location information may refer to information indicative of a geographic location of the apparatus. For instance, in the example of FIG. 5A, apparatus 500 may have determined a homing direction represented by separate apparatus direction indicator 502 based, at least in part, on apparatus location determined by apparatus 510. In this example, the location of apparatus 500 may change to a different location, such as the location of apparatus 520 in the example of FIG. 5B. In this example, apparatus 500 may determine a different homing direction to apparatus 510. In this manner, apparatus 500 may determine a different separate apparatus direction indicator based, at least in part, on the different homing direction to apparatus 510 such that the different separate apparatus indicator indicates a direction from the different location of apparatus 500 to the location of apparatus 510.

In at least one example embodiment, the apparatus determines a different homing direction to the separate apparatus based, at least in part, on a different apparatus orientation. The different apparatus orientation may be determined similar as described regarding FIGS. 4A-4B. For instance, in the example of FIG. 5A, apparatus 500 may have determined a homing direction represented by separate apparatus direction indicator 502 based, at least in part, on the orientation of apparatus 500. In this example, the orientation of apparatus 500 may change to a different apparatus orientation, such as the orientation of apparatus 540 in the example of FIG. 5C. In this example, apparatus 500 may determine a different homing direction to apparatus 510. In this manner, apparatus 500 may determine a different separate apparatus direction indicator based, at least in part, on the different homing direction to apparatus 510 such that the different separate apparatus indicator indicates a direction from apparatus 500 to the location of apparatus 510.

In some circumstances, a user viewing a separate apparatus direction indicator may be unsure what separate apparatus is associated with the separate apparatus direction indicator. For example, the user may have forgotten which separate apparatus a homing session had been established with, the user may desire to see a visual prompt that depicts a visual representation of who the user should be searching for in a crowd of people, and/or the like. In circumstances such as these, it may be desirable for the separate apparatus direction indicator to comprise other information. For example, the separate apparatus direction indicator may comprise a photograph, a visual, a picture, a headshot, an image, a profile image from a phonebook, an image from a social networking profile, a particular color, and/or the like, associated with the separate apparatus. Such additional information may indicate to the user what apparatus is associated with the separate apparatus direction indicator.

In some circumstances, it may be desirable to store data. For example, it may be useful to retrieve data associated with communications, calling, a homing session, and/or the like at a later time. In some circumstances, data may be stored on an apparatus, on a separate apparatus, in a database, in a networked storage array, in a cloud storage platform, and/or the like. In some circumstances, data may be received by the apparatus from a separate apparatus, from a database, from a networked storage array, from a cloud storage platform, and/or the like. For example, the apparatus may send a request to a separate apparatus and receive data from the separate apparatus. For instance, the data may be a phonebook entry. A phonebook entry may refer to information indicative of a user of a separate apparatus. For example, a phonebook entry may comprise a name, a user image, an address, a telephone number, and/or the like associated with a user of a separate apparatus. In some circumstances, a phonebook entry may correspond with the user of the separate apparatus in which a homing session has been established. In circumstances such as these, it may be desirable for the separate apparatus direction indicator to comprise information comprised by the phonebook entry, such as a user image. In at least one example embodiment, the apparatus identifies a phonebook entry stored on the apparatus that corresponds with a user of the separate apparatus. For example, if the homing session was established in response to a call, the apparatus may identify a phonebook entry stored on the apparatus that corresponds with a user of the separate apparatus based on data received during the call, user input used to setup the call, and/or the like. For example, the apparatus may receive caller identification information that identifies information regarding the caller, the caller's apparatus, and/or the like. In at least one example embodiment, the apparatus determines a user image based, at least in part, on the phonebook entry. A user image may refer to a photograph of a user, an icon associated with a user, a graphic associated with a user, and/or the like. In at least one example embodiment, the separate apparatus direction indicator comprises at least part of the user image. In at least one example embodiment, the phonebook entry comprises information indicative of a favorite color. A favorite color may refer to a color associated with a user. For example, the phonebook entry may indicate a color blue for a particular phonebook entry, and a color red for a different phonebook entry. The favorite color may be user selected, initially generated by the apparatus, and/or the like. In at least one example embodiment, a color of the separate apparatus direction indicator corresponds with the favorite color.

Figure 5E:
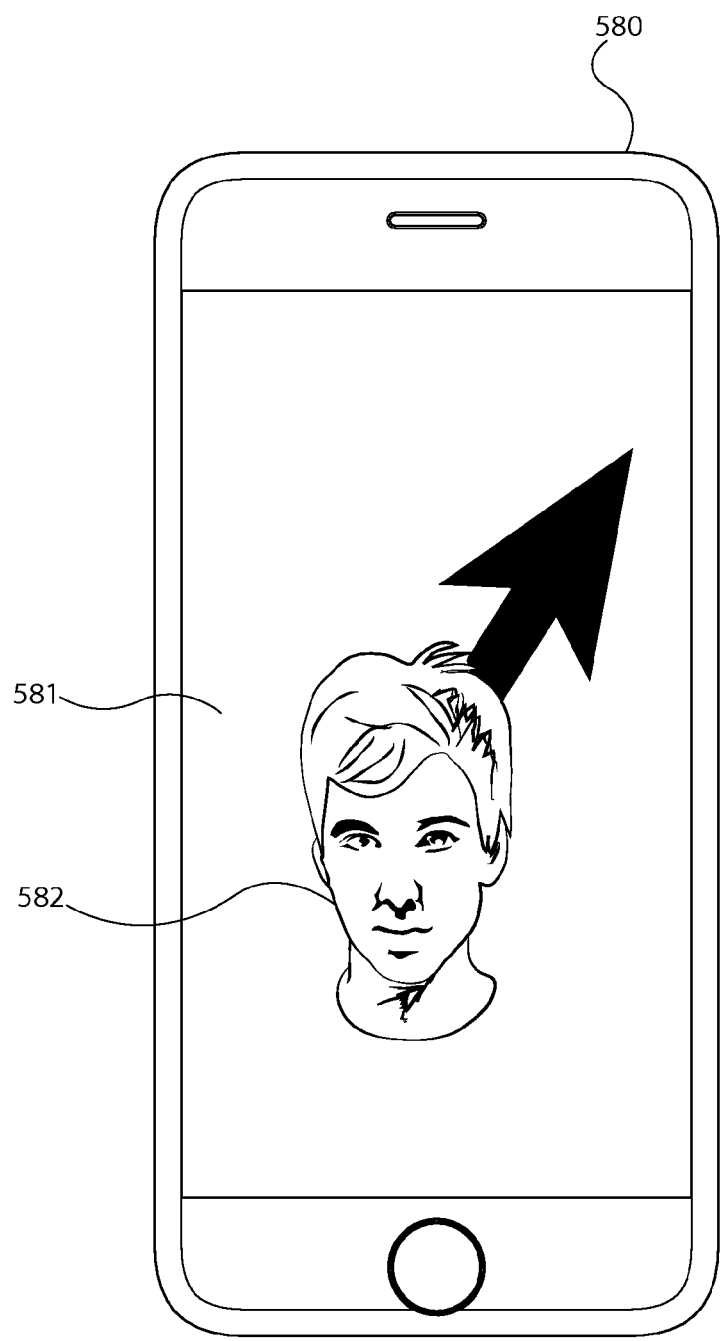

The example of FIG. 5E illustrates apparatus 580 comprising display 581. Apparatus 580 may be similar as described regarding apparatus 10 of FIG. 1, apparatus 202 of FIG. 2, apparatus 204 of FIG. 2, and/or the like. In the example of FIG. 5E, separate apparatus direction indicator 582 is displayed on display 581. It can be seen in the example of FIG. 5E that separate apparatus direction indicator 542 comprises at least part of a user image. In this manner, the user may perceive a representation of the user of the separate apparatus that the user of the apparatus is locating.

Figure 6A:
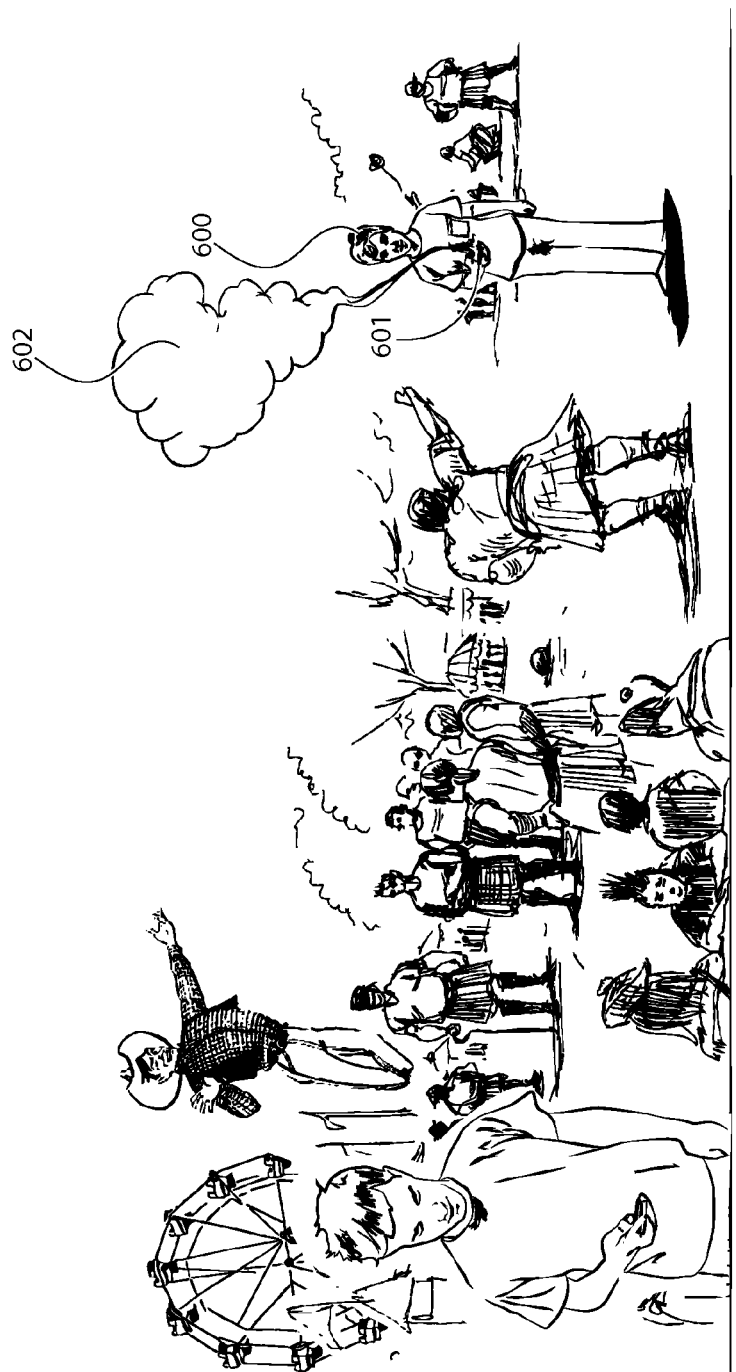
FIGS. 6A-6B are diagrams illustrating proximity alerts according to at least one example embodiment.
Figure 6B:
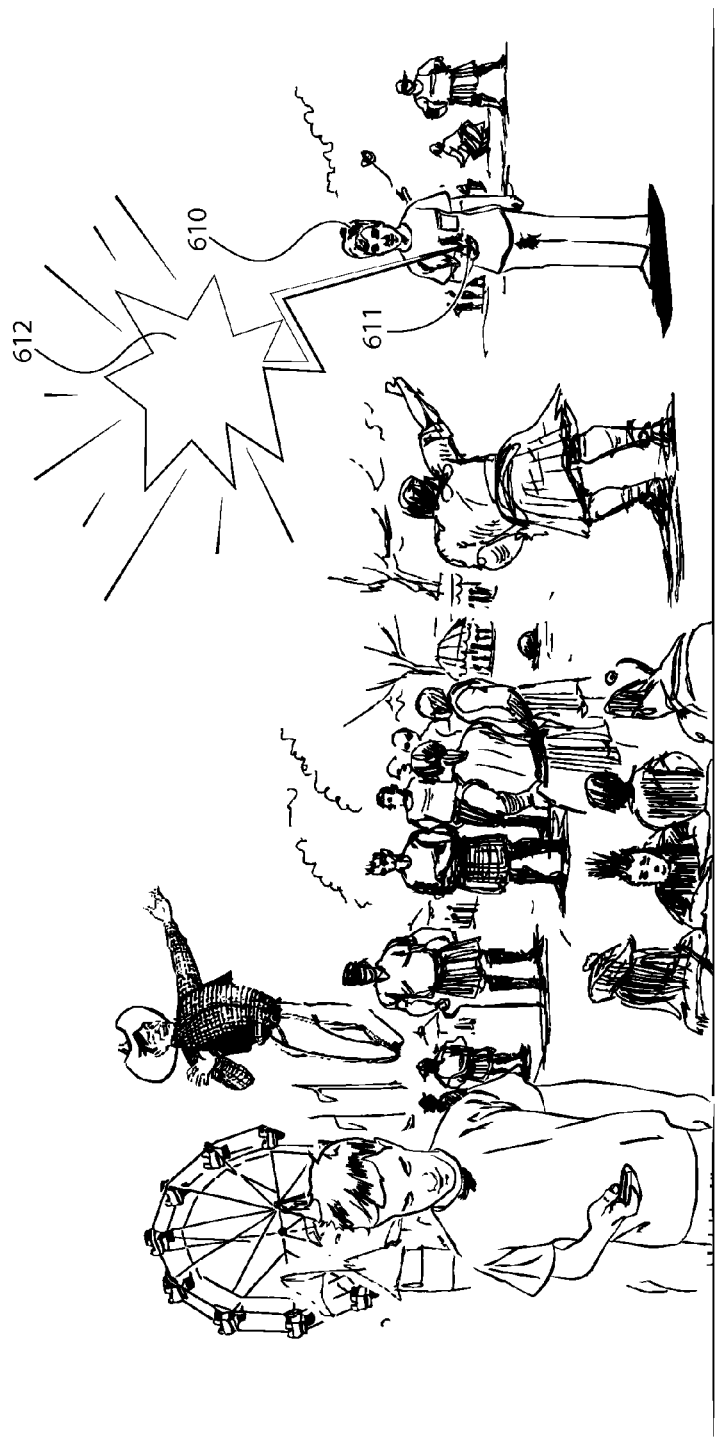

FIGS. 6A-6B are diagrams illustrating proximity alerts according to at least one example embodiment. The examples of FIGS. 6A-6B are merely examples and do not limit the scope of the claims. For example, the type of proximity alert may vary, the number of proximity alerts may vary, the rendering of the proximity alert may vary, and/or the like.

As previously described, it may be difficult for a user of an apparatus to locate a user of a separate apparatus. For example, the user may be in a crowded area, the view of the user of the separate apparatus may be obstructed, the user of the separate apparatus may be located in an area of low visibility such that visual identification of a face may be difficult, and/or the like. In circumstances such as these, it may be desirable for the separate apparatus to render a proximity alert. For example, a proximity alert may grab the attention of the user of the apparatus, may make the user of the separate apparatus easier to locate, may quicken the location of the user of the separate apparatus, and/or the like. A proximity alert may refer to and audible and/or visual alert rendered by an apparatus that may be observed by a person within proximity to the apparatus. For example, the proximity alert may comprise flashing lights, sound effects, synthesized speech, and/or the like. In at least one example embodiment, the separate apparatus renders a proximity alert.

In at least one example embodiment, a visual proximity alert comprises a smoke signal. A smoke signal may comprise an environmental display of particulate matter into the atmosphere perceivable by a bystander. For example, a smoke signal may comprise the generation of water vapor from a fog machine, the release of smoke from an aerosol canister, the launching of a pyrotechnic device, such as an aerial firework, the firing of a cap from a cap gun, and/or the like. The example of FIG. 6A illustrates user 600 holding apparatus 601. Apparatus 601 may be similar as described regarding apparatus 10 of FIG. 1, apparatus 202 of FIG. 2, apparatus 204 of FIG. 2, and/or the like. It can be seen that apparatus 601 is rendering a smoke signal 602. For example, a user may have established a homing session with user 600. The user may become proximate to user 600 and it may be desirable to render a proximity alert. In the example of FIG. 6A, the proximity alert is a smoke signal. In this manner, a user looking for user 600 may see the smoke signal and quickly locate user 600 based on observation of the smoke signal. In at least one example embodiment, the apparatus comprises a fog machine apparatus. In at least one example embodiment, the apparatus comprises an electronic pyrotechnic trigger.

In at least one example embodiment, a visual proximity alert comprises a camera flash signal. A camera flash signal may comprise an environmental display of light perceivable by a bystander. For example, a camera flash signal may comprise the strobing of a light emitting diode, the flashing of an LCD display, and/or the like. In at least one example embodiment, a camera flash signal comprises coded information. For example, a camera flash signal may comprise the flashing of light with a particular pattern, at a particular frequency, and or the like. For instance, the camera flash signal may comprise Morse code. The example of FIG. 6B illustrates user 610 holding apparatus 611. Apparatus 611 may be similar as described regarding apparatus 10 of FIG. 1, apparatus 202 of FIG. 2, apparatus 204 of FIG. 2, and/or the like. It can be seen that apparatus 611 is rendering camera flash signal 612. For example, a user may have established a homing session with user 610. The user may become proximate to user 610 and it may be desirable to render a proximity alert. In the example of FIG. 6B, the proximity alert is a camera flash signal. In this manner, a user looking for user 610 may see the camera flash signal and quickly locate user 610 based on observation of the camera flash signal.

As previously described, it may be desirable to render an audible proximity alert. For example, a user may be able to hear an audible proximity alert in circumstances where the user may be unable to perceive a visual proximity alert, may recognize a particular audio alert in a noisy environment, and/or the like. An audible proximity alert may comprise information indicative of the location of the apparatus, indicative of the user of the apparatus, and/or the like. For example, the audible proximity alert may announce the location of the apparatus, may be rendered in the user's voice, and/or the like. In at least one example embodiment, an audible proximity alert comprises coded information. For example, an audible proximity alert may comprise audio rendered with a particular pattern, at a particular frequency, and or the like. For instance, the audible proximity alert may comprise Morse code. The Morse code may indicate the location of the apparatus, the user of the separate apparatus and/or the like. In at least one example embodiment, an audible proximity alert comprises a voice signal. A voice signal may comprise playback of prerecorded speech, real time generation of speech by a speech synthesizer, and/or the like. The voice signal may be rendered in the user's voice, the user of the separate apparatus's voice, and/or the like. In at least one example embodiment, an audible proximity alert comprises a ringtone signal. A ringtone signal refers to a signal created by the rendering of a ringtone. A ringtone may comprise playback of prerecorded non-speech audio, real time generation of non-speech audio by a synthesizer, and/or the like. The ringtone may be a ringtone frequently used by the user of the apparatus, a ringtone frequently used by the user of the separate apparatus, and/or the like.

In some circumstances, a user of an apparatus may not be proximate to a separate apparatus. For example, during a homing session between an apparatus and a separate apparatus, there may be significant distance between the apparatus and the separate apparatus. In circumstances such as these, it may be desirable to refrain from rendering a proximity alert. For example, the proximity alert may be distracting to bystanders, may be bothersome to the user of the separate apparatus, and/or the like. In circumstances such as these, it may be desirable to cause the separate apparatus render the proximity alert in response to a determination that the apparatus is within a threshold proximity alert distance of the separate apparatus. A proximity threshold alert distance may refer to a distance between an apparatus and a separate apparatus within which a proximity alert rendered by the separate apparatus may be perceived by a user of the apparatus. For example, a visual proximity alert may have a threshold proximity alert distance of 100 feet. In another example, an audible proximity alert may have a threshold proximity alert distance of 25 feet. In at least one example embodiment, the separate apparatus renders a proximity alert in response to a determination that the apparatus is within a threshold proximity alert distance of the separate apparatus.

As previously described, it may be desirable to cause the separate apparatus render a proximity alert in response to a determination that the apparatus is within a threshold proximity alert distance of the separate apparatus. To facilitate such operation, it may be desirable to determine a distance between the apparatus and the separate apparatus, calculate a distance between the apparatus and the separate apparatus, and/or the like. In at least one example embodiment, the apparatus determines a distance between the apparatus and the separate apparatus. The distance may be based, at least in part, on apparatus location information and separate apparatus location information. The distance may be a straight line distance between the apparatus and the separate apparatus, a distance of a route calculated between the apparatus and the separate apparatus, and/or the like. The apparatus location information and the separate apparatus location information may be similar as described regarding FIGS. 3A-3B and FIGS. 5A-5C. In at least one example embodiment, the apparatus determines that the distance is within a threshold proximity alert distance. In at least one example embodiment, the apparatus causes the separate apparatus to render a proximity alert in response to the determination that the distance is within the threshold proximity alert distance. In at least one example embodiment, causation of the separate apparatus to render the proximity alert comprises transmission of a proximity notification to the separate apparatus. A proximity notification may refer to a communication to the separate apparatus that is configured to inform the separate apparatus that the distance is within the threshold proximity alert distance.

In some circumstances, a particular proximity alert may be inappropriate. For example, rendering a smoke signal alert while indoors may trigger a fire alarm system, a camera flash signal may not be perceivable in bright light, an audible signal may be too faint to be heard in a loud setting, and/or the like. In circumstances such as these, it may be desirable for an apparatus to transmit a proximity alert directive to the separate apparatus. A proximity alert directive may comprise information indicative of a command that is configured to cause the separate apparatus to render the proximity alert. For example, the proximity alert directive may specify a proximity alert to comprise a particular type of visual and/or audible proximity alert. In another example, the proximity alert directive may preclude a proximity alert to comprise a particular type of visual and/or audible proximity alert. In at least one example embodiment, causation of the separate apparatus to render a proximity alert comprises transmission of a proximity alert directive to the separate apparatus. In at least one example embodiment, the proximity alert directive comprises a visual proximity alert directive. A visual proximity alert directive may refer to information indicative of a command that is configured to cause the separate apparatus to render a visual proximity alert. In at least one example embodiment, a visual proximity alert directive comprises a smoke signal directive. In at least one example embodiment, a visual proximity alert directive comprises a camera flash signal directive.

In at least one example embodiment, the proximity alert directive comprises an audible proximity alert directive, An audible proximity alert directive may refer to information indicative of a command that is configured to cause the separate apparatus to render an audible proximity alert. In at least one example embodiment, the audible proximity alert directive comprises a voice signal directive. In at least one example embodiment, the audible proximity alert directive comprises a ringtone signal directive.

As previously described, in some circumstances, a smoke signal may cause a safety issue, such as triggering a fire alarm. In circumstances such as these, it may be desirable to limit the rendering of smoke signal to circumstances that lack the safety issue. For example, the separate apparatus may be limited to rendering the smoke signal in circumstances where the separate apparatus is located outdoors. In at least one example embodiment, separate apparatus location information comprises information indicative of an outdoor location. In at least one example embodiment, the transmission of the smoke signal directive is performed in response to the separate apparatus location information being indicative of the outdoor location.

As previously described, in some circumstances a camera flash signal may not be perceivable to a user. For example, in outdoor settings, the camera flash signal may be obscured by the sun. In circumstances such as these, it may be desirable to limit the rendering of a camera flash signal to situation in which the ambient light surrounding the apparatus is dim light. Dim light may refer to an illumination level that is below an illumination level in which a camera flash signal may be perceived. Dim light may vary depending on the apparatus. For example, an apparatus comprising a bright LED may be able to render a perceivable camera flash signal outdoors, while an apparatus comprising an LCD screen may be limited to rendering a perceivable camera flash signal indoors. In at least one example embodiment, the apparatus receives light sensor information from at least one light sensor. Light sensor information may refer to information indicative of the level of ambient illumination surrounding the apparatus and/or the separate apparatus. In at least one example embodiment, the apparatus determines that the light sensor information indicates dim light. In at least one example embodiment, the transmission of a camera flash signal directive is performed in further response to the determination that the light sensor information indicates dim light.

In some circumstances, a particular voice signal may be more recognizable to a user of an apparatus. For example, a user may be able to identify a particular voice, such as his own voice, the voice of a friend or family member, and/or the like, distinctly over another voice, such as a voice generated by a speech synthesizer. As such, it may be desirable for a voice signal to be generated based, at least in part, on a voice profile. A voice profile may refer to information used to create a voice signal comprising characteristics of a particular voice. For example, a voice profile may comprise audio samples of a particular person's speech. Such a voice profile may be stored on an apparatus, stored in a databased, stored on a separate apparatus, and/or the like. In some circumstances, the voice profile may be automatically transferred to an apparatus during a call, during a homing session, and/or the like. In at least one example embodiment, the apparatus identifies a voice profile of a user of the apparatus. In at least one example embodiment, a voice signal directive designates that the voice signal is rendered by way of the voice profile of the user of the apparatus. For example, an apparatus may send a voice signal directive comprising a voice profile of the user of the apparatus to a separate apparatus during a homing session. In response, the separate apparatus may render a voice signal in conformance with the voice profile of the user of the apparatus. In this manner, the user of the apparatus may recognize their own voice, and quickly locate the user of the separate apparatus. In at least one example embodiment, the apparatus identifies a voice profile of a user of the separate apparatus. In at least one example embodiment, the voice signal directive designates that the voice signal is generated by way of the voice profile of the user of the separate apparatus. For example, an apparatus may send a voice signal directive comprising a voice profile of the user of the separate apparatus to a separate apparatus during a homing session. In response, the separate apparatus may generate a voice signal in conformance with the voice profile of the user of the separate apparatus. In this manner, the user of the apparatus may recognize the user of the separate apparatus's voice, and quickly locate the user of the separate apparatus.

In some circumstances, a particular ringtone signal may be stand out from ambient noise to a user of an apparatus. For example, a user may be able to identify a particular ringtone, such as a ringtone associated with a particular phonebook entry, distinctly over ambient noise, such as crowd noise. In such an example, the user may be able to distinguish between the particular ringtone and a different ringtone that may be simultaneously audible to the user. In circumstances such as these, it may be desirable for a ringtone signal directive to designate a particular ringtone, for example, a ringtone signal associated with a call. In at least one example embodiment, the apparatus identifies a ringtone associated with the call. A ringtone may be associated with a call by being a default ringtone, a ringtone associated with a user group, a ringtone associated with a phonebook entry corresponding with a user of the separate apparatus, a ringtone specified by the user, and/or the like. In at least one example embodiment, the ringtone signal directive designates that the ringtone signal is generated by way of rendering the ringtone. For example, an apparatus may send a ringtone signal directive designating a ringtone to a separate apparatus during a homing session. In response, the separate apparatus may render a ringtone in conformance with the ringtone signal directive. In this manner, the user of the apparatus may recognize the ringtone, and quickly locate the user of the separate apparatus.

Figure 7:
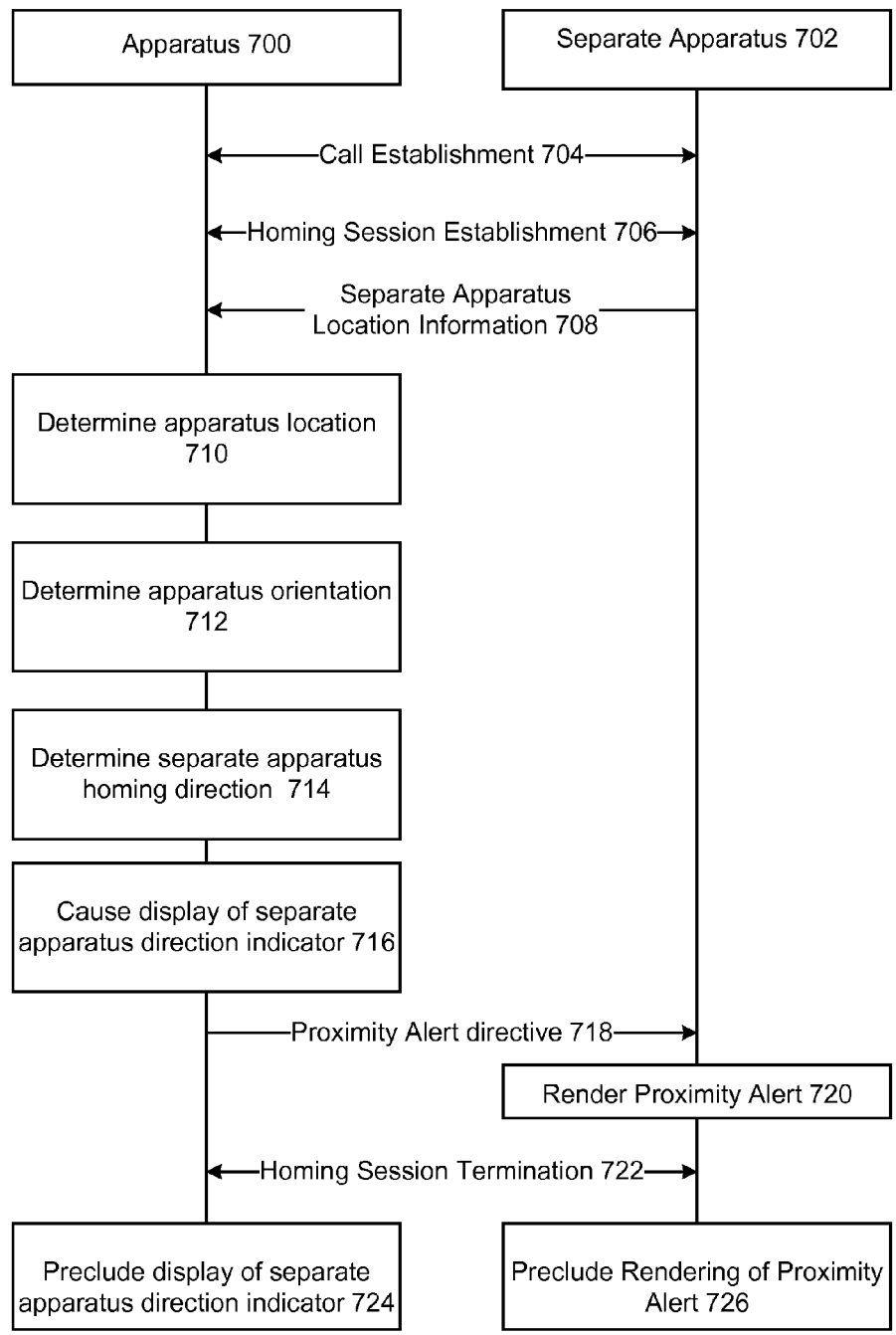
FIG. 7 is an interaction diagram illustrating activities associated with a homing session between an apparatus and a separate apparatus according to at least one example embodiment.

FIG. 7 is an interaction diagram illustrating activities associated with a homing session between an apparatus and a separate apparatus according to at least one example embodiment. In at least one example embodiment, the apparatus and the separate apparatus are comprised by a system. In at least one example embodiment, there is a set of operations that corresponds with, at least some of, the activities of FIG. 7. For example, there may be a set of operations associated with activities of one or more apparatuses of FIG. 7. A system and/or an apparatus, for example electronic apparatus 10 of FIG. 1, or a portion thereof, apparatus 202 of FIG. 2, or a portion thereof, or apparatus 204 of FIG. 2, may utilize the set of operations. The system and/or the apparatus may comprise means, including, for example processor 11 of FIG. 1, for performance of such operations. In an example embodiment, a system, and/or an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As previously described, a homing session may be established between an apparatus and a separate apparatus. FIG. 7 illustrates activities associated with a homing session in a system comprising apparatus 700 apparatus 702. Apparatus 700 and/or separate apparatus 702 may be similar as described regarding apparatus 10 of FIG. 1, apparatus 202 of FIG. 2, apparatus 204 of FIG. 2, and/or the like.

At interaction 704, the system comprising apparatus 700 and apparatus 702 establishes a call between apparatus 700 and apparatus 702. The apparatuses and the establishment of the call may be similar as described regarding FIG. 2.

At interaction 706, the system establishes a homing session between apparatus 700 and apparatus 700 based, at least in part, on the call. The establishment and the homing session may be similar as described regarding FIGS. 3A-3B.

At interaction 708, apparatus 700 receives separate apparatus location information from apparatus 702. The receipt and the location information may be similar as described regarding FIGS. 5A-5E.

At interaction 710, apparatus 700 determines the location of apparatus 700. The determination and the location may be similar as described regarding FIGS. 5A-5E.

At interaction 712, apparatus 700 determines the orientation of apparatus 700. The determination and the location may be similar as described regarding FIGS. 4A-4B and FIGS. 5A-5E.

At interaction 714, apparatus 700 determines a homing direction to apparatus 702, based, at least in part, the location of apparatus 702, the location of apparatus 700, and the orientation of apparatus 700. The determination and the homing direction may be similar as described regarding FIGS. 5A-5E.

At interaction 716, apparatus 700 causes display of an apparatus 702 direction indicator. The display and the apparatus 702 direction indicator may be similar as described regarding FIGS. 5A-5E.

At interaction 718, apparatus 702 receives a proximity alert directive from apparatus 700. The receipt and the proximity alert directive may be similar as described regarding FIGS. 6A-6B.

At interaction 720, apparatus 702 renders a proximity alert in response to the determination that the distance is within the threshold proximity alert distance. The rendering and the proximity alert may be similar as described regarding FIGS. 6A-6B.

At interaction 722, the system terminates the homing session between apparatus 700 and separate apparatus 700. The termination may be similar as described regarding FIG. 2 and FIGS. 3A-3B. At interaction 724, apparatus 700 precludes display of the apparatus 702 direction indicator in response to the termination of the homing session between apparatus 700 and separate apparatus 702.

At interaction 726, apparatus 702 precludes rendering of the proximity alert in response to the termination of the homing session between apparatus 700 and separate apparatus 702.

Figure 8:
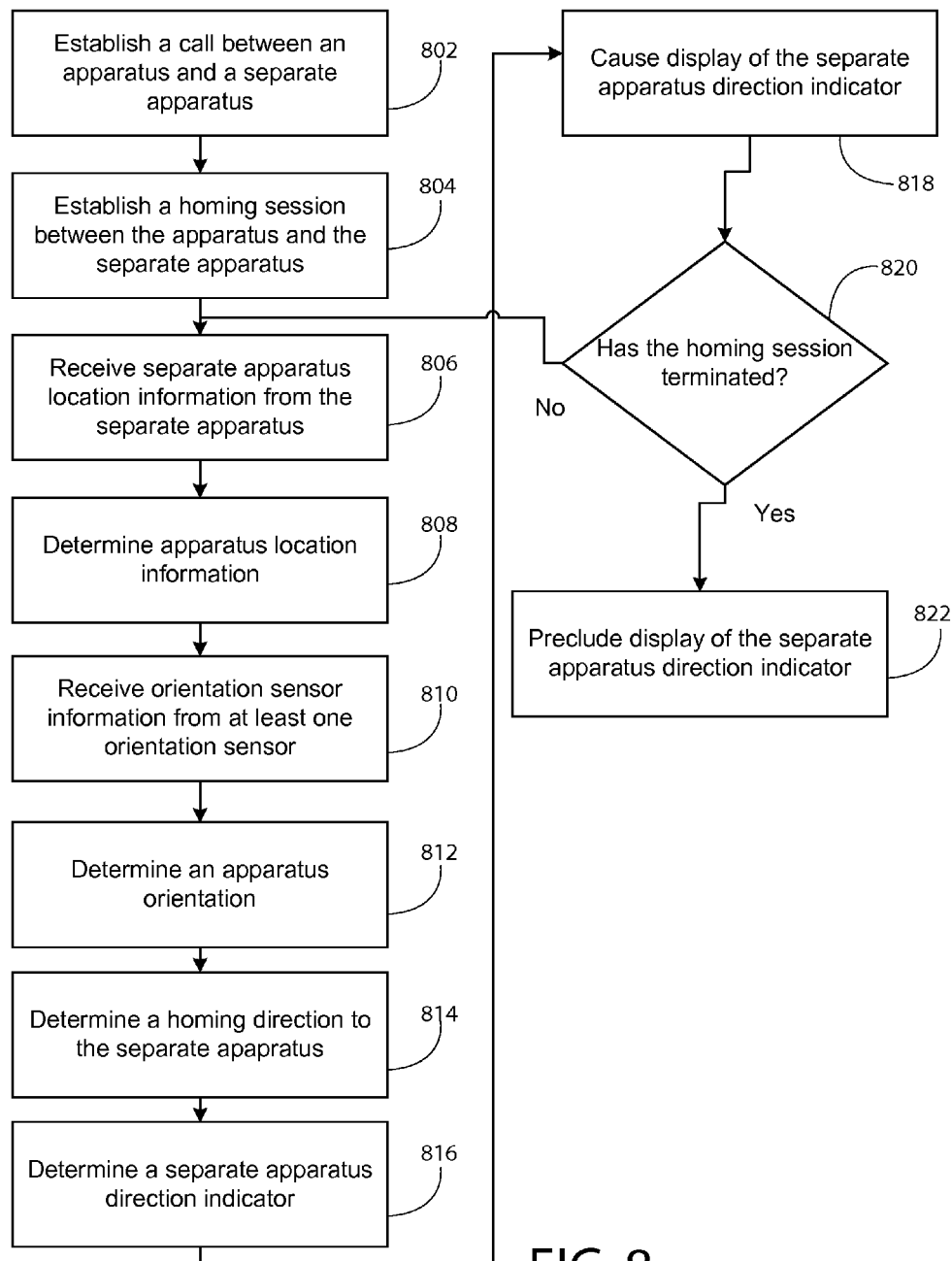
FIG. 8 is a flow diagram illustrating activities associated with a homing session between an apparatus and a separate apparatus according to at least one example embodiment.

FIG. 8 is a flow diagram illustrating activities associated with a homing session between an apparatus and a separate apparatus according to at least one example embodiment. In at least one example embodiment, there is a set of operations that corresponds with the activities of FIG. 8. An apparatus, for example electronic apparatus 10 of FIG. 1, or a portion thereof, may utilize the set of operations. A system, for example the system of FIG. 7, or a portion thereof, may utilize the set of operations. The apparatus and/or the system may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8. In an example embodiment, a system, for example the system FIG. 7, is transformed by having memory, for example memory 12 of FIG. 1, comprising computer code configured to, working with a processor, for example processor 11 of FIG. 1, cause the apparatus to perform set of operations of FIG. 8.

As previously described, in some circumstances an apparatus may establish a homing session with a separate apparatus.

At block 802, the apparatus establishes a call between the apparatus and a separate apparatus. The apparatus, the establishment, the call, and the separate apparatus may be similar as described regarding FIG. 1, FIG. 2, and FIGS. 3A-3B.

At block 804, the apparatus establishes a homing session between the apparatus and the separate apparatus. The establishment of the homing session between the apparatus and the separate apparatus may be based, at least in part, on the call. The establishment and the homing session between the apparatus and the separate apparatus may be similar as described regarding FIGS. 3A-3B, FIGS. 5A-5E, FIGS. 6A-6B, and FIG. 7.

At block 806, the apparatus receives separate apparatus location information from the separate apparatus. The receipt and the separate apparatus location information may be similar as described regarding FIG. 3, FIGS. 5A-5E, and FIG. 7.

At block 808, the apparatus determines apparatus location information. The determination and the apparatus location information may be similar as described regarding FIG. 3, FIGS. 5A-5E, and FIG. 7.

At block 810, the apparatus receives orientation sensor information from at least one orientation sensor. The receipt, the orientation sensor information, and the at least one orientation sensor may be similar as described regarding FIG. 1, FIGS. 4A-4B, and FIG. 7.

At block 812, the apparatus determines an apparatus orientation. The determination may be based, at least in part, on the orientation sensor information. The determination and the apparatus orientation may be similar as described regarding FIGS. 4A-4B and FIG. 7.

At block 814, the apparatus determines a homing direction to the separate apparatus. The determination may be based, at least in part, on the separate apparatus location information, the apparatus location information, and the apparatus orientation. The determination, and the homing direction may be similar as described regarding FIGS. 5A-5E and FIG. 7.

At block 816, the apparatus determines a separate apparatus direction indicator. The determination and the separate apparatus direction indicator may be similar as described regarding FIGS. 5A-5E and FIG. 7.

At block 818, the apparatus causes display of the separate apparatus direction indicator. The display may be similar as described regarding FIGS. 5A-5E and FIG. 7.

At block 820, the apparatus determines if the homing session between the apparatus and the separate apparatus has been terminated. The termination may be similar as described regarding FIGS. 3A-3B and FIG. 7. If the homing session between the apparatus and the separate apparatus has not been terminated, flow proceeds to block 806. If the homing session between the apparatus and the separate apparatus has been terminated, flow proceeds to block 822.

At block 822, the apparatus precludes display of the separate apparatus direction indicator. The preclusion may be in response to the termination of the homing session between the apparatus and the separate apparatus. The preclusion may be similar as described regarding FIGS. 5A-5E and FIG. 7.

Figure 9:
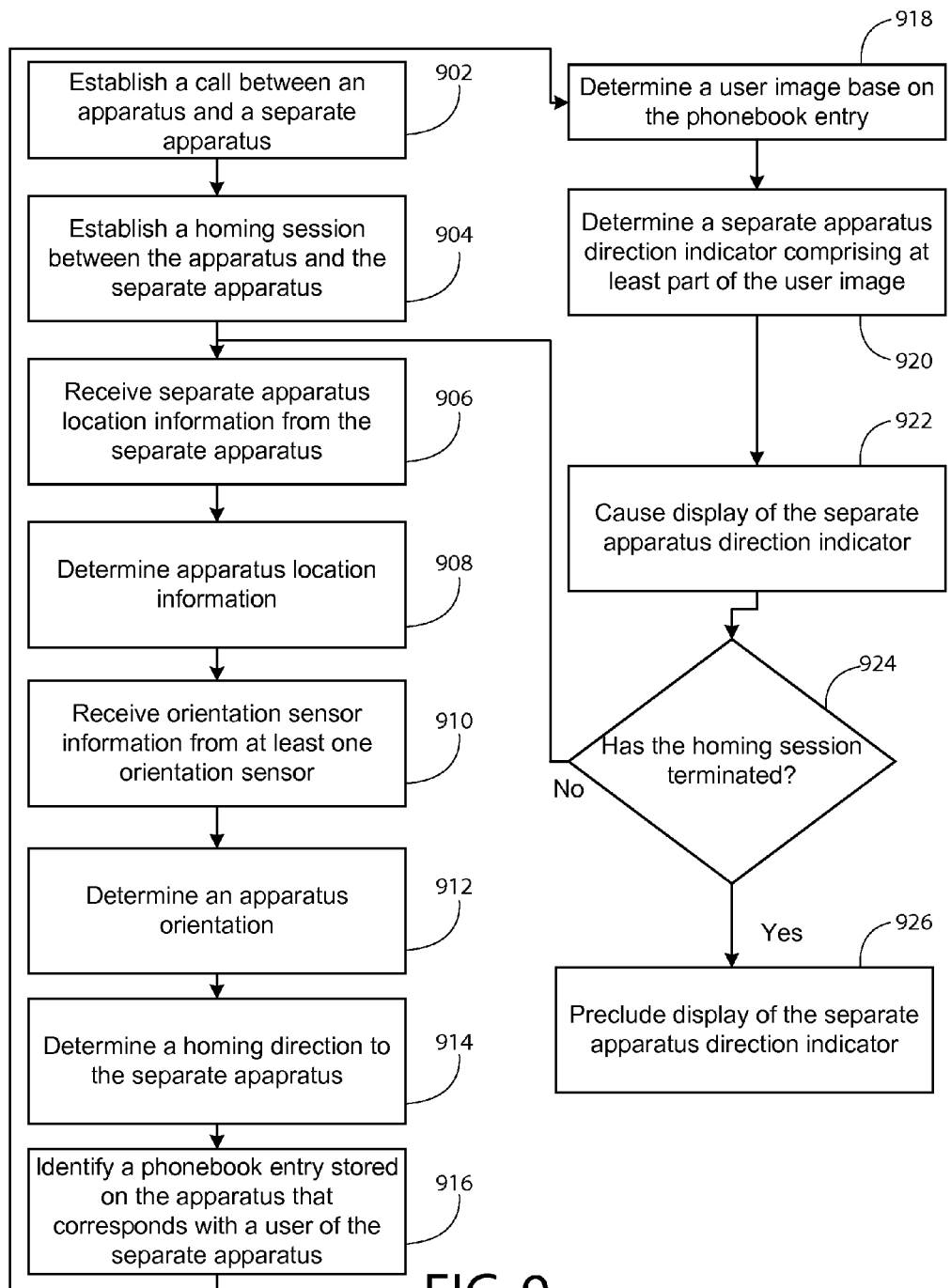
FIG. 9 is a flow diagram illustrating activities associated with display of a separate apparatus direction indicator according to at least one example embodiment.

FIG. 9 is a flow diagram illustrating activities associated with display of a separate apparatus direction indicator according to at least one example embodiment. In at least one example embodiment, there is a set of operations that corresponds with the activities of FIG. 9. An apparatus, for example electronic apparatus 10 of FIG. 1, or a portion thereof, may utilize the set of operations. A system, for example the system of FIG. 7, or a portion thereof, may utilize the set of operations. The apparatus and/or the system may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9. In an example embodiment, a system, for example the system of FIG. 7, is transformed by having memory, for example memory 12 of FIG. 1, comprising computer code configured to, working with a processor, for example processor 11 of FIG. 1, cause the apparatus to perform set of operations of FIG. 9.

As previously described, in some circumstances an apparatus may display a separate apparatus direction indicator.

At block 902, the apparatus establishes a call between the apparatus and a separate apparatus, similarly as described regarding block 802 of FIG. 8. At block 904, the apparatus establishes a homing session between the apparatus and the separate apparatus, similarly as described regarding block 804 of FIG. 8. At block 906, the apparatus receives separate apparatus location information from the separate apparatus, similarly as described regarding block 806 of FIG. 8. At block 908, the apparatus determines apparatus location information, similarly as described regarding block 808 of FIG. 8. At block 910, the apparatus receives orientation sensor information from at least one orientation sensor, similarly as described regarding block 810 of FIG. 8. At block 912, the apparatus determines an apparatus orientation, similarly as described regarding block 812 of FIG. 8. At block 914, the apparatus determines a homing direction to the separate apparatus, similarly as described regarding block 814 of FIG. 8.

At block 916, the apparatus identifies a phonebook entry stored on the apparatus that corresponds with a user of the separate apparatus. The identification, the phonebook entry, the correspondence, and the user may be similar as described regarding FIGS. 5A-5E.

At block 918, the apparatus determines a user image based, at least in part, on the phonebook entry. The determination and the user image may be similar as described regarding FIGS. 5A-5E.

At block 920, the apparatus determines a separate apparatus direction indicator. The separate apparatus direction indicator may comprise at least part of the user image. The determination and the separate apparatus direction indicator may be similar as described regarding FIGS. 5A-5E.

At block 922, the apparatus causes display of the separate apparatus direction indicator, similarly as described regarding block 818 of FIG. 8. At block 924, the apparatus determines if the homing session between the apparatus and the separate apparatus has been terminated, similarly as described regarding block 820 of FIG. 8. If the homing session between the apparatus and the separate apparatus has not been terminated, flow proceeds to block 906. If the homing session between the apparatus and the separate apparatus has been terminated, flow proceeds to block 926. At block 926, the apparatus precludes display of the separate apparatus direction indicator, similarly as described regarding block 822 of FIG. 8.

Figure 10:
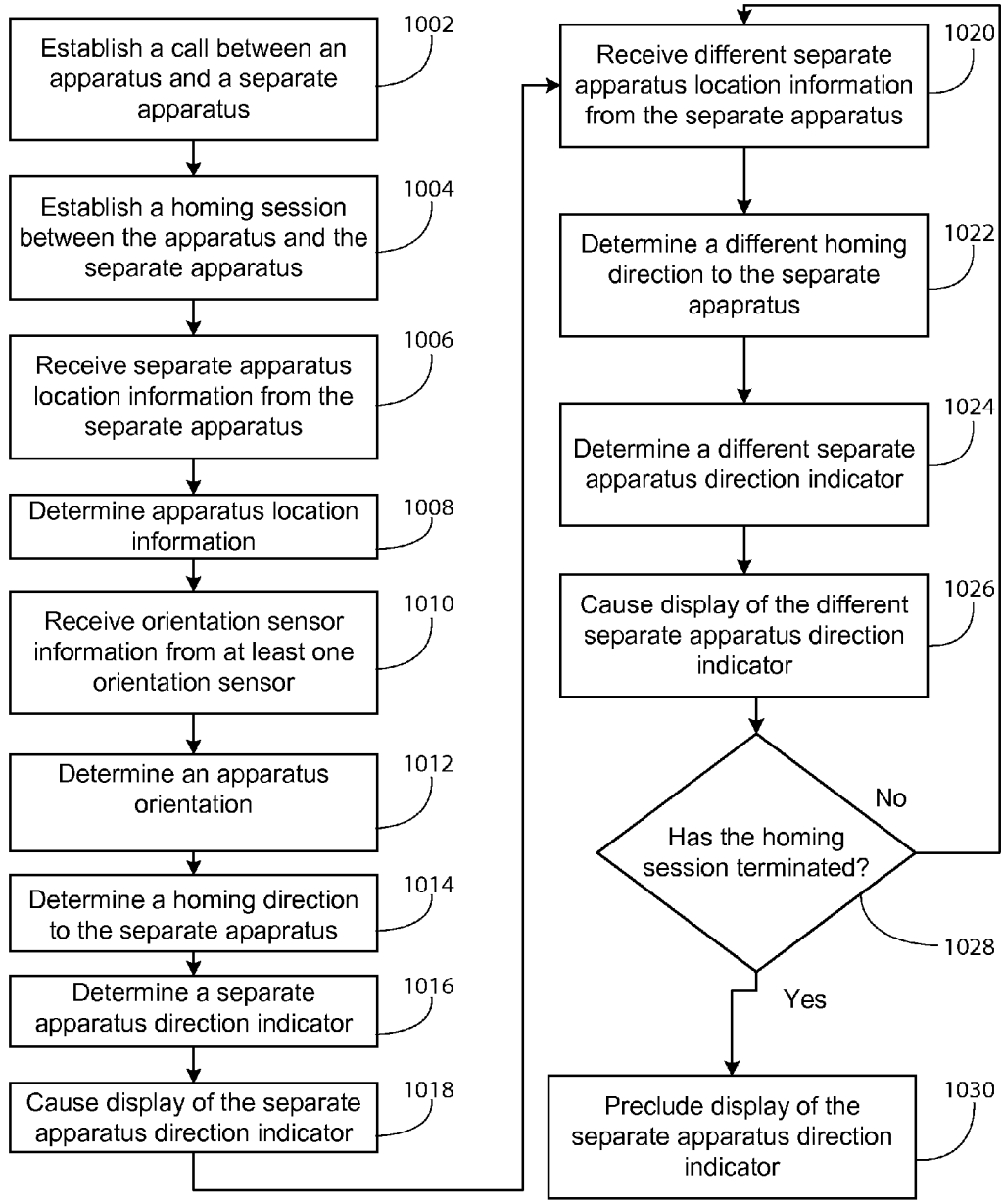
FIG. 10 is a flow diagram illustrating activities associated with determination of a separate apparatus location according to at least one example embodiment.

FIG. 10 is a flow diagram illustrating activities associated with determination of a separate apparatus location according to at least one example embodiment. In at least one example embodiment, there is a set of operations that corresponds with the activities of FIG. 10. An apparatus, for example electronic apparatus 10 of FIG. 1, or a portion thereof, may utilize the set of operations. A system, for example the system of FIG. 7, or a portion thereof, may utilize the set of operations. The apparatus and/or the system may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10. In an example embodiment, a system, for example the system of FIG. 7, is transformed by having memory, for example memory 12 of FIG. 1, comprising computer code configured to, working with a processor, for example processor 11 of FIG. 1, cause the apparatus to perform set of operations of FIG. 10.

As previously described, in some circumstances an apparatus may receive different separate apparatus location information from the separate apparatus. In this manner, the apparatus may determine a different homing direction to the separate apparatus based, at least in part, on the different separate apparatus location information.

At block 1002, the apparatus establishes a call between the apparatus and a separate apparatus, similarly as described regarding block 802 of FIG. 8. At block 1004, the apparatus establishes a homing session between the apparatus and the separate apparatus, similarly as described regarding block 804 of FIG. 8. At block 1006, the apparatus receives separate apparatus location information from the separate apparatus, similarly as described regarding block 806 of FIG. 8. At block 1008, the apparatus determines apparatus location information, similarly as described regarding block 808 of FIG. 8. At block 1010, the apparatus receives orientation sensor information from at least one orientation sensor, similarly as described regarding block 810 of FIG. 8. At block 1012, the apparatus determines an apparatus orientation, similarly as described regarding block 812 of FIG. 8. At block 1014, the apparatus determines a homing direction to the separate apparatus, similarly as described regarding block 814 of FIG. 8. At block 1016, the apparatus determines a separate apparatus direction indicator, similarly as described regarding block 816 of FIG. 8. At block 1018, the apparatus causes display of the separate apparatus direction indicator, similarly as described regarding block 818 of FIG. 8.

At block 1020, the apparatus receives different separate apparatus location information from the separate apparatus. The receipt and the separate apparatus location information may be similar as described regarding FIG. 3, FIGS. 5A-5E, and FIG. 7.

At block 1022, the apparatus determines a different homing direction to the separate apparatus. The determination may be based, at least in part, on the different separate apparatus location information, the apparatus location information, and the apparatus orientation. The determination, and the homing direction may be similar as described regarding FIGS. 5A-5E and FIG. 7.

At block 1024, the apparatus determines a different separate apparatus direction indicator that represents the different homing direction to the separate apparatus. The determination and the separate apparatus direction indicator may be similar as described regarding FIGS. 5A-5E and FIG. 7.

At block 1026, the apparatus causes display of the different separate apparatus direction indicator. The display may be similar as described regarding FIGS. 5A-5E and FIG. 7.

At block 1028, the apparatus determines if the homing session between the apparatus and the separate apparatus has been terminated, similarly as described regarding block 820 of FIG. 8. If the homing session between the apparatus and the separate apparatus has not been terminated, flow proceeds to block 1020. If the homing session between the apparatus and the separate apparatus has been terminated, flow proceeds to block 1030. At block 1030, the apparatus precludes display of the separate apparatus direction indicator, similarly as described regarding block 822 of FIG. 8.

Figure 11:
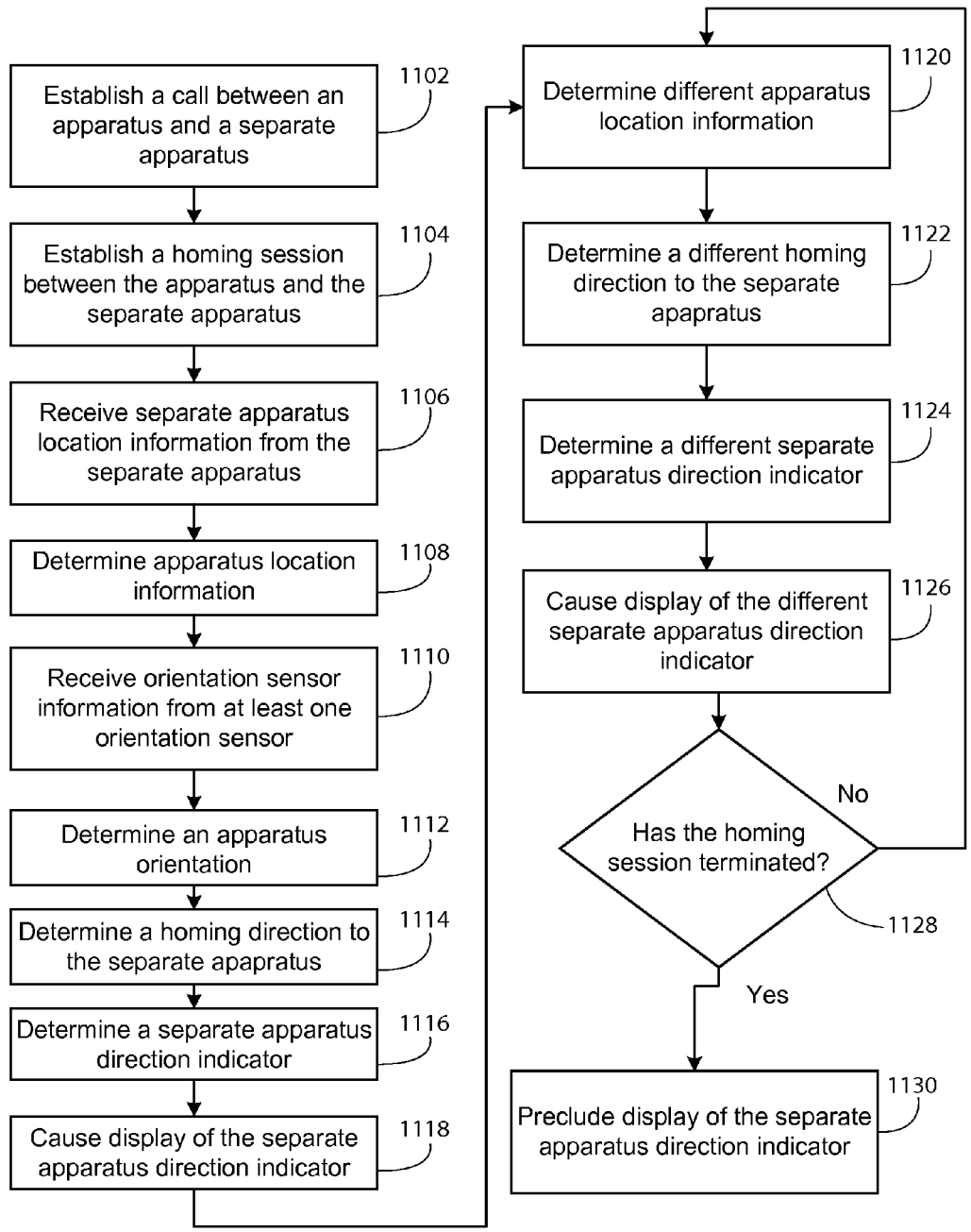
FIG. 11 is a flow diagram illustrating activities associated with determination of an apparatus location according to at least one example embodiment.

FIG. 11 is a flow diagram illustrating activities associated with determination of an apparatus location according to at least one example embodiment. In at least one example embodiment, there is a set of operations that corresponds with the activities of FIG. 11. An apparatus, for example electronic apparatus 10 of FIG. 1, or a portion thereof, may utilize the set of operations. A system, for example the system of FIG. 7, or a portion thereof, may utilize the set of operations. The apparatus and/or the system may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11. In an example embodiment, a system, for example the system of FIG. 7, is transformed by having memory, for example memory 12 of FIG. 1, comprising computer code configured to, working with a processor, for example processor 11 of FIG. 1, cause the apparatus to perform set of operations of FIG. 11.

As previously described, in some circumstances an apparatus determine a different apparatus location information. In this manner, the apparatus may determine a different homing direction to the separate apparatus based, at least in part, on the different apparatus location information.

At block 1102, the apparatus establishes a call between the apparatus and a separate apparatus, similarly as described regarding block 802 of FIG. 8. At block 1104, the apparatus establishes a homing session between the apparatus and the separate apparatus, similarly as described regarding block 804 of FIG. 8. At block 1106, the apparatus receives separate apparatus location information from the separate apparatus, similarly as described regarding block 806 of FIG. 8. At block 1108, the apparatus determines apparatus location information, similarly as described regarding block 808 of FIG. 8. At block 1110, the apparatus receives orientation sensor information from at least one orientation sensor, similarly as described regarding block 810 of FIG. 8. At block 1112, the apparatus determines an apparatus orientation, similarly as described regarding block 812 of FIG. 8. At block 1114, the apparatus determines a homing direction to the separate apparatus, similarly as described regarding block 814 of FIG. 8. At block 1116, the apparatus determines a separate apparatus direction indicator, similarly as described regarding block 816 of FIG. 8. At block 1118, the apparatus causes display of the separate apparatus direction indicator, similarly as described regarding block 818 of FIG. 8.

At block 1120, the apparatus determines different apparatus location information. The determination and the apparatus location information may be similar as described regarding FIG. 3, FIGS. 5A-5E, and FIG. 7.

At block 1122, the apparatus determines a different homing direction to the separate apparatus. The determination may be based, at least in part, on the separate apparatus location information, the different apparatus location information, and the apparatus orientation. The determination, and the homing direction may be similar as described regarding FIGS. 5A-5E and FIG. 7.

At block 1124, the apparatus determines a different separate apparatus direction indicator that represents the different homing direction to the separate apparatus. The determination and the separate apparatus direction indicator may be similar as described regarding FIGS. 5A-5E and FIG. 7.

At block 1126, the apparatus causes display of the different separate apparatus direction indicator. The display may be similar as described regarding FIGS. 5A-5E and FIG. 7.

At block 1128, the apparatus determines if the homing session between the apparatus and the separate apparatus has been terminated, similarly as described regarding block 820 of FIG. 8. If the homing session between the apparatus and the separate apparatus has not been terminated, flow proceeds to block 1120. If the homing session between the apparatus and the separate apparatus has been terminated, flow proceeds to block 1130. At block 1130, the apparatus precludes display of the separate apparatus direction indicator, similarly as described regarding block 822 of FIG. 8.

Figure 12:
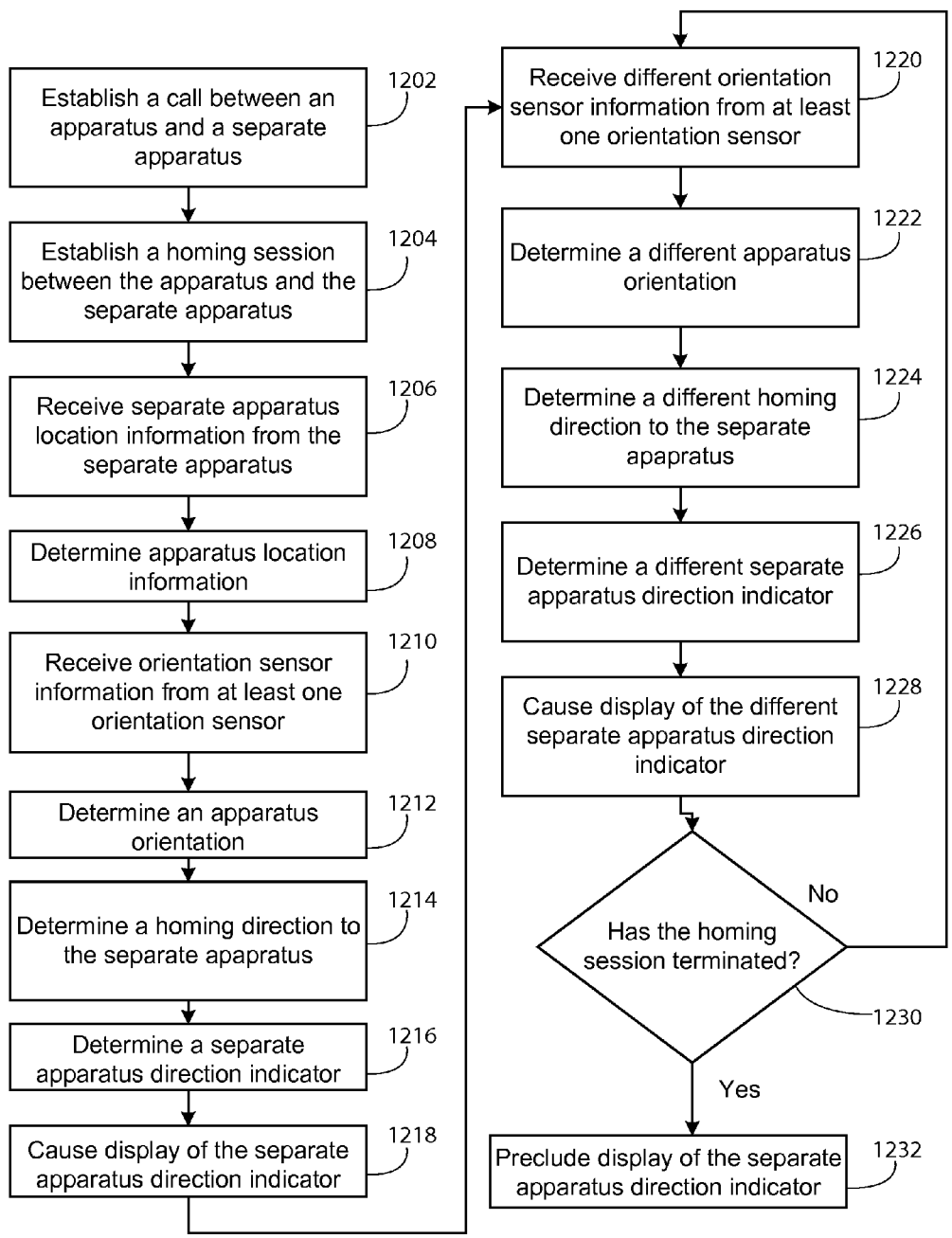
FIG. 12 is a flow diagram illustrating activities associated with determination of an apparatus orientation according to at least one example embodiment.

FIG. 12 is a flow diagram illustrating activities associated with determination of an apparatus orientation according to at least one example embodiment. In at least one example embodiment, there is a set of operations that corresponds with the activities of FIG. 12. An apparatus, for example electronic apparatus 10 of FIG. 1, or a portion thereof, may utilize the set of operations. A system, for example the system of FIG. 7, or a portion thereof, may utilize the set of operations. The apparatus and/or the system may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12. In an example embodiment, a system, for example the system of FIG. 7, is transformed by having memory, for example memory 12 of FIG. 1, comprising computer code configured to, working with a processor, for example processor 11 of FIG. 1, cause the apparatus to perform set of operations of FIG. 12.

As previously described, in some circumstances an apparatus determine a different apparatus orientation. In this manner, the apparatus may determine a different homing direction to the separate apparatus based, at least in part, on the different apparatus orientation.

At block 1202, the apparatus establishes a call between the apparatus and a separate apparatus, similarly as described regarding block 802 of FIG. 8. At block 1204, the apparatus establishes a homing session between the apparatus and the separate apparatus, similarly as described regarding block 804 of FIG. 8. At block 1206, the apparatus receives separate apparatus location information from the separate apparatus, similarly as described regarding block 806 of FIG. 8. At block 1208, the apparatus determines apparatus location information, similarly as described regarding block 808 of FIG. 8. At block 1210, the apparatus receives orientation sensor information from at least one orientation sensor, similarly as described regarding block 810 of FIG. 8. At block 1212, the apparatus determines an apparatus orientation, similarly as described regarding block 812 of FIG. 8. At block 1214, the apparatus determines a homing direction to the separate apparatus, similarly as described regarding block 814 of FIG. 8. At block 1216, the apparatus determines a separate apparatus direction indicator, similarly as described regarding block 816 of FIG. 8. At block 1218, the apparatus causes display of the separate apparatus direction indicator, similarly as described regarding block 818 of FIG. 8.

At block 1220, the apparatus receives different orientation sensor information from the at least one orientation sensor. The receipt, and the orientation sensor information may be similar as described regarding FIG. 1, FIGS. 4A-4B, and FIG. 7.

At block 1222, the apparatus determines a different apparatus orientation. The determination may be based, at least in part, on the different orientation sensor information. The determination and the apparatus orientation may be similar as described regarding FIGS. 4A-4B, and FIG. 7.

At block 1224, the apparatus determines a different homing direction to the separate apparatus. The determination may be based, at least in part, on the separate apparatus location information, the apparatus location information, and the different apparatus orientation. The determination, and the homing direction may be similar as described regarding FIGS. 5A-5E and FIG. 7.

At block 1226, the apparatus determines a different separate apparatus direction indicator that represents the different homing direction to the separate apparatus. The determination and the separate apparatus direction indicator may be similar as described regarding FIGS. 5A-5E and FIG. 7.

At block 1228, the apparatus causes display of the different separate apparatus direction indicator. The display may be similar as described regarding FIGS. 5A-5E and FIG. 7.

At block 1230, the apparatus determines if the homing session between the apparatus and the separate apparatus has been terminated, similarly as described regarding block 820 of FIG. 8. If the homing session between the apparatus and the separate apparatus has not been terminated, flow proceeds to block 1220. If the homing session between the apparatus and the separate apparatus has been terminated, flow proceeds to block 1232. At block 1232, the apparatus precludes display of the separate apparatus direction indicator, similarly as described regarding block 822 of FIG. 8.

Figure 13:
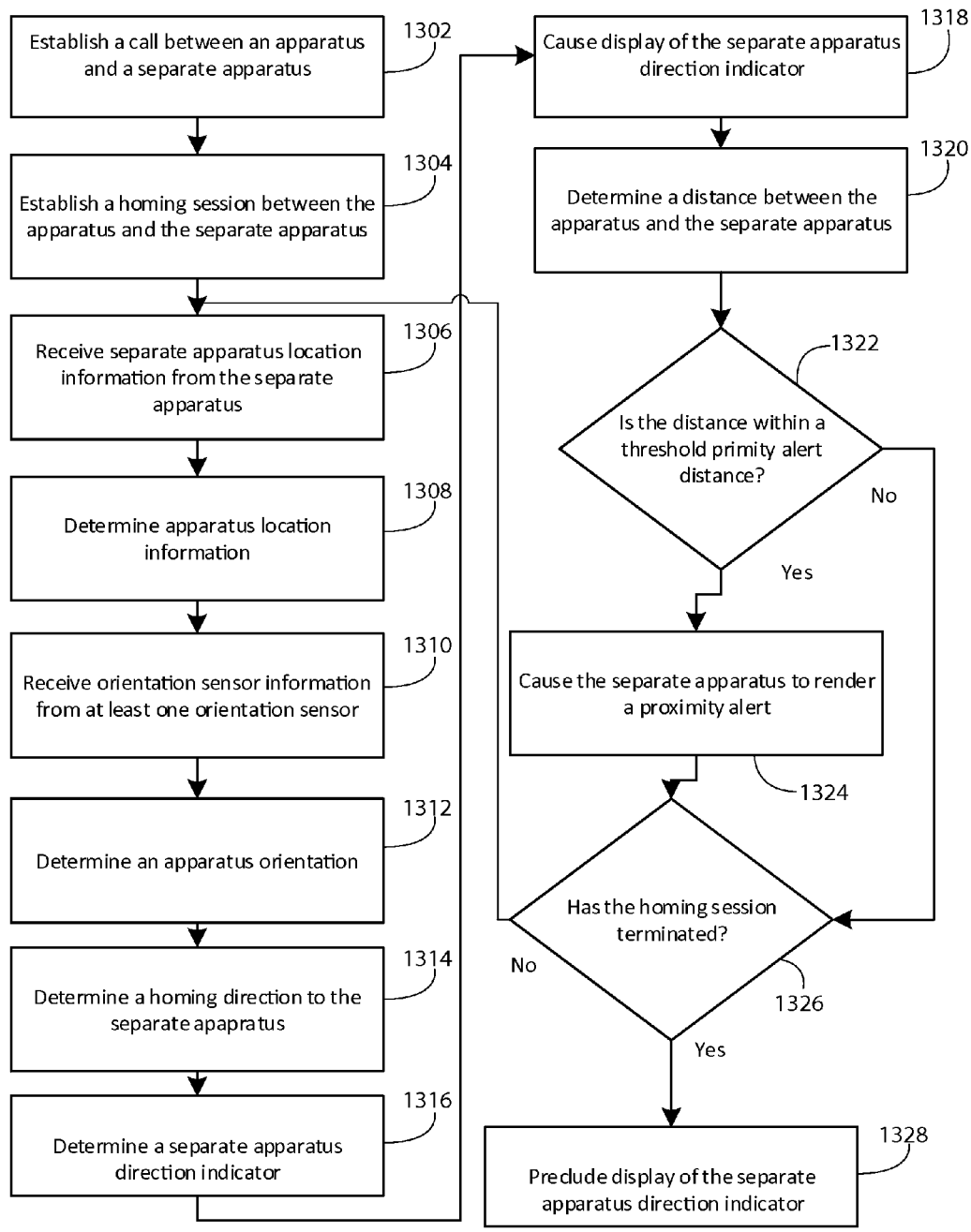
FIG. 13 is a flow diagram illustrating activities associated with rendering of a proximity alert according to at least one example embodiment.

FIG. 13 is a flow diagram illustrating activities associated with rendering of a proximity alert according to at least one example embodiment. In at least one example embodiment, there is a set of operations that corresponds with the activities of FIG. 13. An apparatus, for example electronic apparatus 10 of FIG. 1, or a portion thereof, may utilize the set of operations. A system, for example the system of FIG. 7, or a portion thereof, may utilize the set of operations. The apparatus and/or the system may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13. In an example embodiment, a system, for example the system of FIG. 7, is transformed by having memory, for example memory 12 of FIG. 1, comprising computer code configured to, working with a processor, for example processor 11 of FIG. 1, cause the apparatus to perform set of operations of FIG. 13.

As previously described, in some circumstances an apparatus may cause a separate apparatus to render a proximity alert.

At block 1302, the apparatus establishes a call between the apparatus and a separate apparatus, similarly as described regarding block 802 of FIG. 8. At block 1304, the apparatus establishes a homing session between the apparatus and the separate apparatus, similarly as described regarding block 804 of FIG. 8. At block 1306, the apparatus receives separate apparatus location information from the separate apparatus, similarly as described regarding block 806 of FIG. 8. At block 1308, the apparatus determines apparatus location information, similarly as described regarding block 808 of FIG. 8. At block 1310, the apparatus receives orientation sensor information from at least one orientation sensor, similarly as described regarding block 810 of FIG. 8. At block 1312, the apparatus determines an apparatus orientation, similarly as described regarding block 812 of FIG. 8. At block 1314, the apparatus determines a homing direction to the separate apparatus, similarly as described regarding block 814 of FIG. 8. At block 1316, the apparatus determines a separate apparatus direction indicator, similarly as described regarding block 816 of FIG. 8. At block 1318, the apparatus causes display of the separate apparatus direction indicator, similarly as described regarding block 818 of FIG. 8.

At block 1320, the apparatus determines a distance between the apparatus and the separate apparatus. The determination may be based, at least in part, on the apparatus location information and the separate apparatus location information. The determination and the distance may be similar as described regarding FIGS. 3A-3B, FIGS. 5A-5E, FIGS. 6A-6B, and FIG. 7.

At block 1322, the apparatus determines if the distance is within a threshold proximity alert distance. The determination and the threshold proximity alert distance may be similar as described regarding FIGS. 6A-6B and FIG. 7. If the apparatus determines that the distance is within a threshold proximity alert distance, flow proceeds to block 1324. If the apparatus determines that the distance is not within a threshold proximity alert distance, flow proceeds to block 1326.

At block 1324, the apparatus causes the separate apparatus to render a proximity alert. The rendering may be in response to the determination that the distance is within the threshold proximity alert distance. The rendering and the proximity alert may be similar as described regarding FIGS. 6A-6B and FIG. 7.

At block 1326, the apparatus determines if the homing session between the apparatus and the separate apparatus has been terminated, similarly as described regarding block 820 of FIG. 8. If the homing session between the apparatus and the separate apparatus has not been terminated, flow proceeds to block 1306. If the homing session between the apparatus and the separate apparatus has been terminated, flow proceeds to block 1328. At block 1328, the apparatus precludes display of the separate apparatus direction indicator, similarly as described regarding block 822 of FIG. 8.

Embodiments of the invention may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 806 of FIG. 8 may be performed after block 808 of FIG. 8. Furthermore, if desired, one or more of the above-described functions may be optional or may be combined. For example, block 806 of FIG. 8 may be optional and/or combined with block 808 of FIG. 8.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;
   at least one memory including non-transitory computer program code, the memory and the computer program code configured to, working with the processor, cause the apparatus to perform at least the following:
   establishment of a call between an apparatus and a separate apparatus, the call being at least one of a voice call or a video call;
   establishment of a homing session between the apparatus and the separate apparatus based, at least in part, on the call;
   receipt of separate apparatus location information from the separate apparatus, the separate apparatus location information being information indicative of a geographic location of the separate apparatus;
   determination of apparatus location information, the apparatus location information being information indicative of a geographic location of the apparatus;
   receipt of orientation sensor information from at least one orientation sensor;
   determination of an apparatus orientation based, at least in part, on the orientation sensor information, the apparatus orientation being indicative of an orientation of a display with respect to a geographical reference direction;
   determination of a homing direction to the separate apparatus based, at least in part, the separate apparatus location information, the apparatus location information, and the apparatus orientation, the homing direction being a direction from the apparatus to the separate apparatus relative to the apparatus orientation;
   determination of a separate apparatus direction indicator that represents the homing direction to the separate apparatus;
   causation of display of the separate apparatus direction indicator;
   determination of a distance between the apparatus and the separate apparatus based, at least in part, on the apparatus location information and the separate apparatus location information;
   determination that the distance is within a threshold proximity alert distance;
   transmission of a smoke signal directive to the separate apparatus, the smoke signal directive being information indicative of a command that is configured to cause the separate apparatus to render a smoke signal;
   termination of the homing session between the apparatus and the separate apparatus; and
   preclusion of display of the separate apparatus direction indicator in response to the termination of the homing session between the apparatus and the separate apparatus.

2. The apparatus of claim 1, wherein the separate apparatus location information comprises information indicative of an outdoor location, and the transmission of the smoke signal directive is performed in further response to the separate apparatus location information being indicative of the outdoor location.

3. The apparatus of claim 1, wherein the memory includes non-transitory computer program code configured to, working with the processor, cause the apparatus to perform rendering of a camera flash signal in response to the determination that the distance is within the threshold proximity alert distance.

4. The apparatus of claim 3, wherein the memory includes non-transitory computer program code configured to, working with the processor, cause the apparatus to perform:
   receipt of light sensor information from at least one light sensor; and
   determination that the light sensor information indicates dim light, wherein the rendering of the camera flash signal is performed in further response to the determination that the light sensor information indicates dim light.

5. The apparatus of claim 1, wherein the memory includes non-transitory computer program code configured to, working with the processor, cause the apparatus to perform transmission of an audible proximity alert directive to the separate apparatus in response to the determination that the distance is within the threshold proximity alert distance, the audible proximity alert directive being information indicative of a command that is configured to cause the separate apparatus to render an audible proximity alert.

6. The apparatus of claim 5, wherein the audible proximity alert comprises a voice signal, and the audible proximity alert directive comprises a voice signal directive.

7. The apparatus of claim 6, wherein the memory includes non-transitory computer program code configured to, working with the processor, cause the apparatus to perform identification of a voice profile of a user of the apparatus, wherein the voice signal directive designates that the voice signal is rendered by way of the voice profile of the user of the apparatus.

8. The apparatus of claim 6, wherein the memory includes non-transitory computer program code configured to, working with the processor, cause the apparatus to perform identification of a voice profile of a user of the separate apparatus, wherein the voice signal directive designates that the voice signal is generated by way of the voice profile of the user of the separate apparatus.

9. A method comprising:
   establishing a call between an apparatus and a separate apparatus, the call being at least one of a voice call or a video call;
   establishing a homing session between the apparatus and the separate apparatus based, at least in part, on the call;
   receiving separate apparatus location information from the separate apparatus, the separate apparatus location information being information indicative of a geographic location of the separate apparatus;
   determining apparatus location information, the apparatus location information being information indicative of a geographic location of the apparatus;
   receiving orientation sensor information from at least one orientation sensor;
   determining an apparatus orientation based, at least in part, on the orientation sensor information, the apparatus orientation being indicative of an orientation of a display with respect to a geographical reference direction;
   determining a homing direction to the separate apparatus based, at least in part, the separate apparatus location information, the apparatus location information, and the apparatus orientation, the homing direction being a direction from the apparatus to the separate apparatus relative to the apparatus orientation;

determining a separate apparatus direction indicator that represents the homing direction to the separate apparatus;

causing display of the separate apparatus direction indicator;

identifying at least one of a voice profile of a user of the apparatus or a voice profile of a user of the separate apparatus;

determining a distance between the apparatus and the separate apparatus based, at least in part, on the apparatus location information and the separate apparatus location information;

determining that the distance is within a threshold proximity alert distance; and transmitting a voice signal directive to the separate apparatus, the voice signal directive being information indicative of a command that is configured to cause the separate apparatus to render a voice signal by way of at least one of a voice profile of the user of the apparatus or a voice profile of the user of the separate apparatus;

terminating the homing session between the apparatus and the separate apparatus; and precluding display of the separate apparatus direction indicator in response to the termination of the homing session between the apparatus and the separate apparatus.

10. The method of claim 9, wherein causation of display of the separate apparatus direction indicator is performed absent display of map information.

11. The method of claim 9, further comprising terminating the call.

12. The method of claim 9, further comprising transmitting a visual proximity alert directive to the separate apparatus in response to the determination that the distance is within the threshold proximity alert distance, the visual proximity alert directive being information indicative of a command that is configured to cause the separate apparatus to render a visual proximity alert.

13. The method of claim 12, wherein the visual proximity alert comprises a smoke signal, and the visual proximity alert directive comprises a smoke signal directive.

14. The method of claim 13, wherein the separate apparatus location information comprises information indicative of an outdoor location, and the transmission of the smoke signal directive is performed in further response to the separate apparatus location information being indicative of the outdoor location.

15. The method of claim 12, wherein the visual proximity alert comprises a camera flash signal.

16. The method of claim 15, further comprising:

receiving light sensor information from at least one light sensor; and determining that the light sensor information indicates dim light, wherein the rendering of the camera flash signal is performed in further response to the determination that the light sensor information indicates dim light.

17. A system comprising:

a first apparatus and a second apparatus, the first apparatus and the second apparatus comprising at least one processor, at least one memory, at least one display, and at least one orientation sensor, the memory comprising instructions that when executed by the processor cause the system to perform:

establishment of a call between the first apparatus and the second apparatus, the call being at least one of a voice call or a video call;

establishment of a homing session between the first apparatus and the second apparatus based, at least in part, on the call;

determination, by the second apparatus, of second apparatus location information, the second apparatus location information being information indicative of a geographic location of the second apparatus;

transmission, from the second apparatus to the first apparatus, of the second apparatus location information;

determination, by the first apparatus, of first apparatus location information, the first apparatus location information being information indicative of a geographic location of the first apparatus;

receipt, by the first apparatus, of orientation sensor information from the orientation sensor;

determination, by the first apparatus, of a first apparatus orientation based, at least in part, on the orientation sensor information, the first apparatus orientation being indicative of an orientation of the display with respect to a geographical reference direction;

determination, by the first apparatus, of a homing direction to the second apparatus based, at least in part, the second apparatus location information, the first apparatus location information, and the first apparatus orientation, the homing direction being a direction from the first apparatus to the second apparatus relative to the first apparatus orientation;

determination, by the first apparatus, of a second apparatus direction indicator that represents the homing direction to the second apparatus;

display, by the first apparatus, of the second apparatus direction indicator;

determination of a distance between the first apparatus and the second apparatus based, at least in part, on the first apparatus location information and the second apparatus location information;

determination that the distance is within a threshold proximity alert distance;

receipt of light sensor information from at least one light sensor;

determination that the light sensor information indicates dim light;

rendering, by the second apparatus, of a camera flash signal in response to the determination that the distance is within the threshold proximity alert distance, wherein the rendering of the camera flash signal is performed in further response to the determination that the light sensor information indicates dim light;

termination of the homing session between the first apparatus and the second apparatus; and preclusion of display, by the first apparatus, of the second apparatus direction indicator in response to the termination of the homing session between the first apparatus and the second apparatus.

18. The system of claim 17, wherein the memory further comprises instructions that when executed by the processor cause the system to perform rendering, by the second apparatus, of an audible proximity alert in response to the determination that the distance is within the threshold proximity alert distance.

19. The system of claim 18, wherein the audible proximity alert comprises a voice signal.

20. The system of claim 17, wherein the memory further comprises instructions that when executed by the processor cause the system to perform rendering, by the second apparatus, of a smoke signal in response to the determination that the distance is within the threshold proximity alert distance.

* * * * *